United States Patent [19]
Widnall et al.

[11] Patent Number: 5,181,678
[45] Date of Patent: Jan. 26, 1993

[54] FLEXIBLE TAILORED ELASTIC AIRFOIL SECTION

[75] Inventors: Sheila E. Widnall; William S. Widnall, both of Lexington, Mass.; William E. Gorgen, Wayzata, Minn.; Jeffrey T. Evernham, Carmel, Ind.

[73] Assignee: Flex Foil Technology, Inc., Lexington, Mass.

[21] Appl. No.: 650,472

[22] Filed: Feb. 4, 1991

[51] Int. Cl.[5] ............................................. B64C 3/52
[52] U.S. Cl. ......................................... 244/219; 244/123; 244/76 R; 114/127; 114/162; 114/140; 416/240
[58] Field of Search ................... 244/12.5, 219, 123, 244/213–215, 48, 76 R; 416/240, 24, 138 R, 138 A, 136; 114/127, 135, 136, 142, 143, 162, 39, 39.2

[56] References Cited

U.S. PATENT DOCUMENTS

| | | | |
|---|---|---|---|
| 1,341,758 | 6/1920 | Parka | 244/219 |
| 3,275,083 | 9/1966 | Allin | 416/136 |
| 3,332,383 | 7/1967 | Wright | 244/219 |
| 3,753,415 | 8/1973 | Burtis | 114/127 |
| 3,954,230 | 5/1976 | Machuta | 244/219 |
| 3,999,886 | 12/1976 | Ormistan et al. | 415/138 A |
| 4,000,868 | 1/1977 | Gregor | 416/240 |
| 4,235,397 | 11/1980 | Compton | 244/219 |
| 4,280,433 | 7/1981 | Haddock | 114/127 |
| 4,461,611 | 7/1984 | Michel | 416/24 |
| 4,537,143 | 8/1985 | Gaide | 114/39.2 |
| 4,865,275 | 9/1989 | Thompson | 244/219 |
| 5,082,207 | 1/1992 | Tulinius | 244/76 R |

OTHER PUBLICATIONS

Rockwell International, Highly Maneuverable Aircraft Technology (HiMAT).

Primary Examiner—Galen Barefoot
Attorney, Agent, or Firm—Jerry Cohen; Harvey Kaye

[57] ABSTRACT

A flexible airfoil section for a wing or a blade comprising a streamlined shape and an elastic structure whose stiffness distribution along its chord and span is tailored to provide a desirable cambered shape with proportional increases in camber with increases in lift, mounted to a supporting structure such that the airfoil sections are free to pivot about axes near their leading and trailing edges. In operation, the foil derives much of its lift from elastic bending deformation of its flexible shape, thereby achieving a higher lift than a symmetric foil at the same angle of attack while postponing the onset of flow separation and stall and, for operation in water, of ventilation and cavitation. A wing or blade of general planform comprising flexible elastic airfoil sections which can be used to stabilize, or to control the direction of travel of, as well as provide side force for, a watercraft such as a sailboat or a sailboard, or for application to a variety of aircraft components and configurations to provide lift and side force and as well can serve as the aerodynamic surfaces of various types of fluid machinery including fans, helicopter rotors and wind turbines operating in subsonic flow.

50 Claims, 13 Drawing Sheets

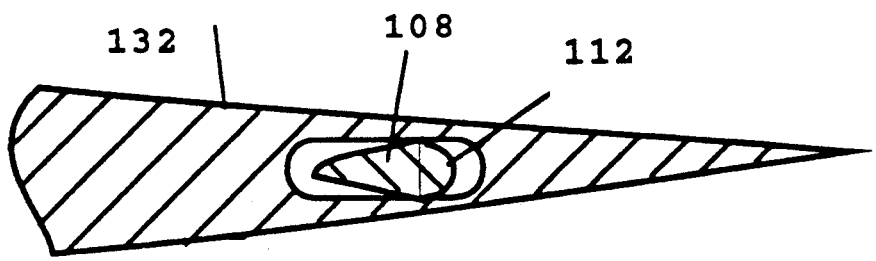
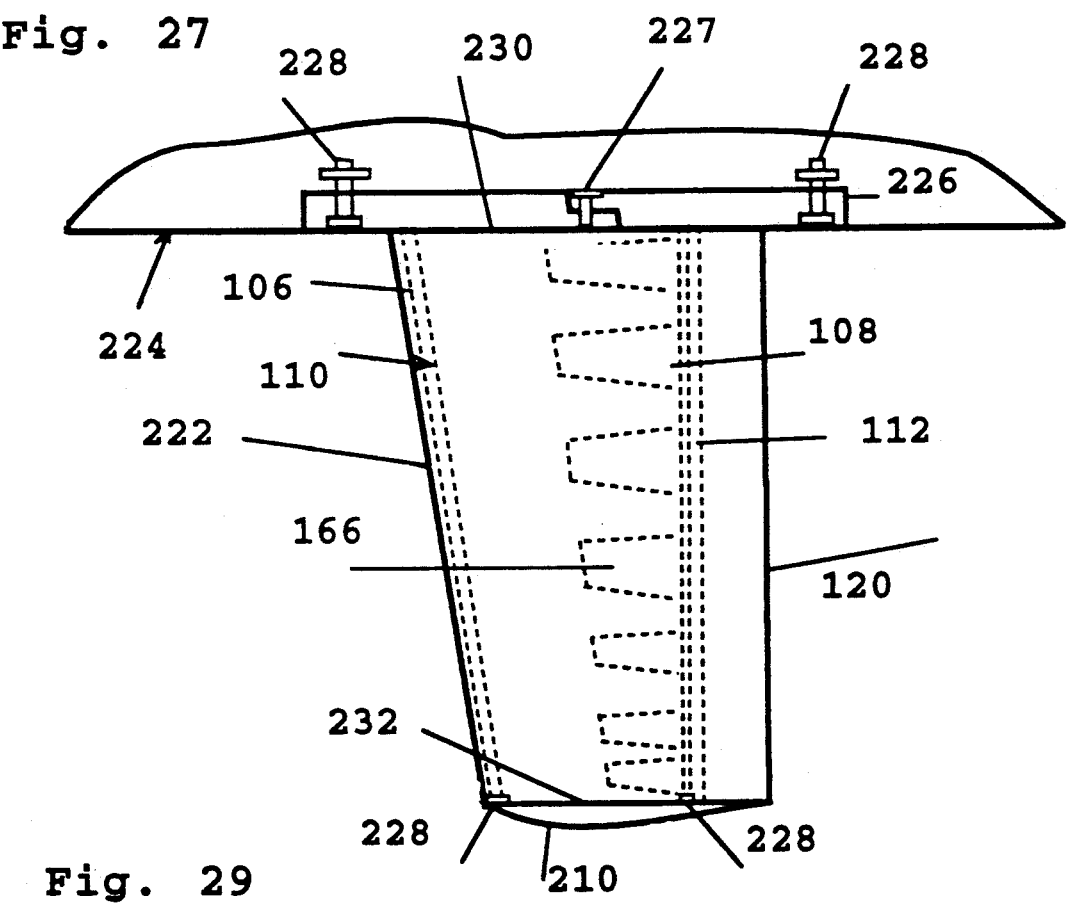
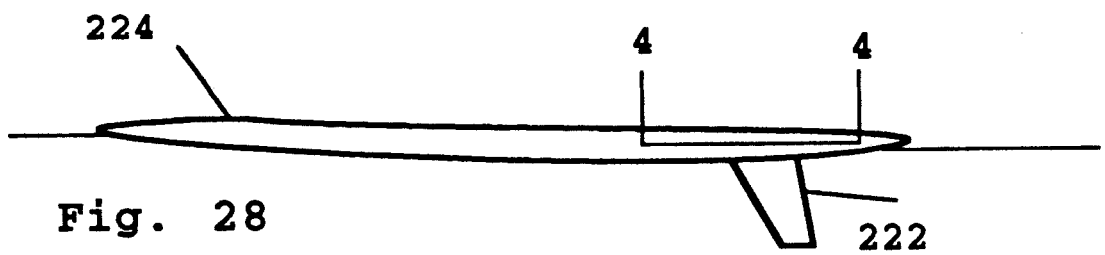

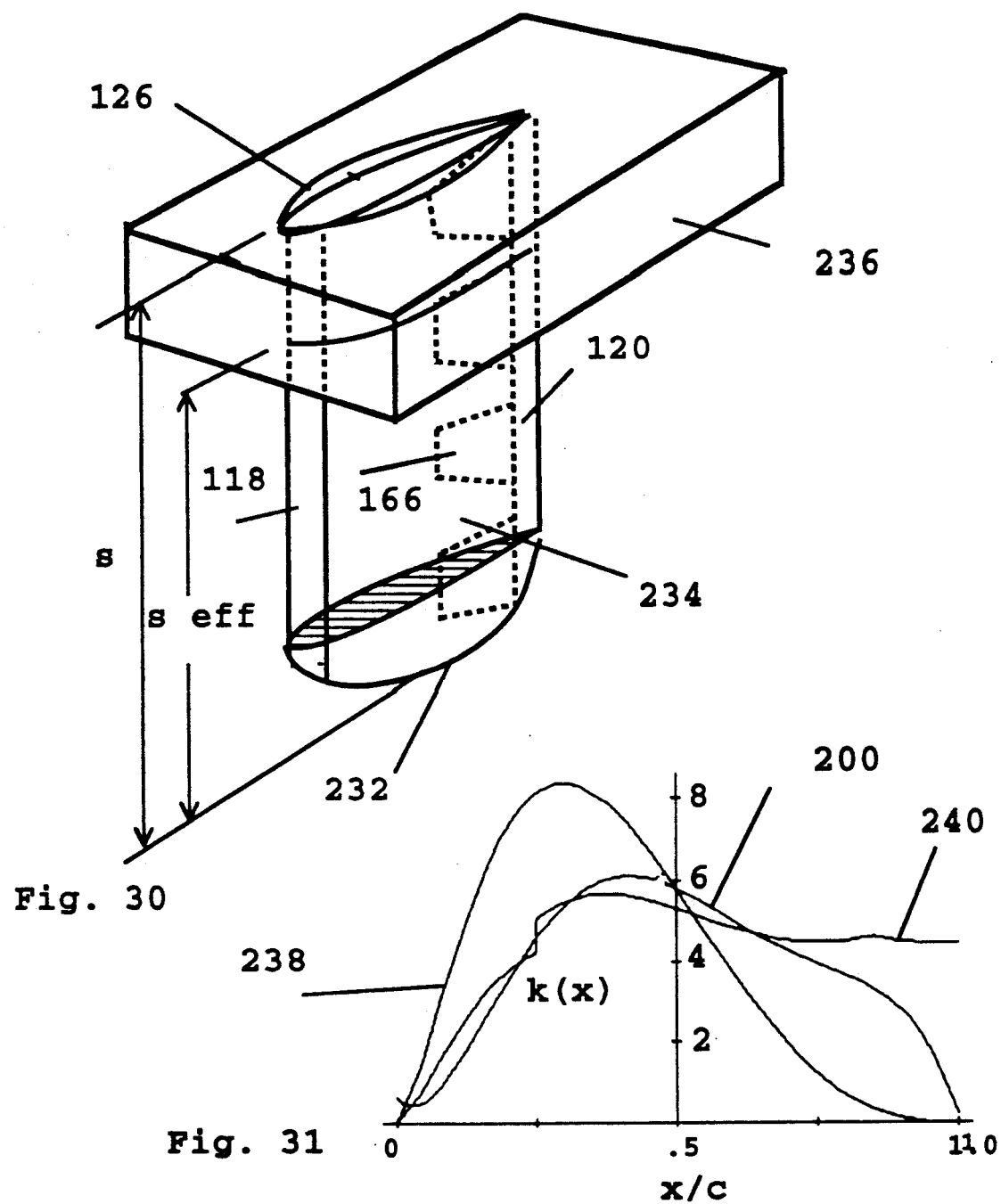
Fig. 30
Fig. 31
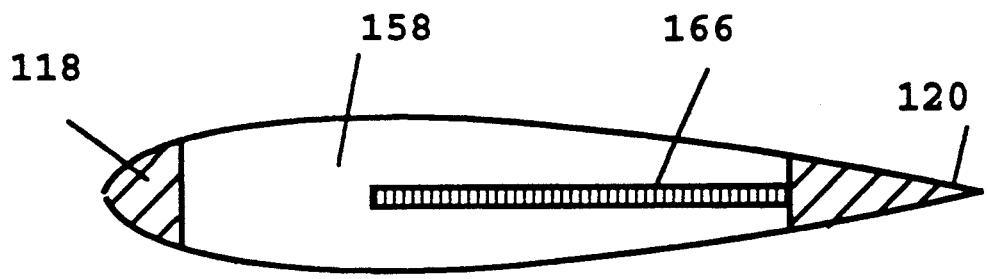
Fig. 32

FLEXIBLE TAILORED ELASTIC AIRFOIL SECTION

BACKGROUND OF THE INVENTION

1. Field of the Invention

The present invention provides a flexible elastic airfoil section that adapts its shape to loading requirements, and a finite wing or blade made up of such airfoil sections, that obtains a substantial portion of its lift from cambered deflections. Such an airfoil section has application in a variety of subsonic aerodynamic and hydrodynamic applications whenever a wing or blade is required to produce both positive and negative loads as well as to generate a wide range of forces with good aerodynamic efficiency. The invention can be used to stabilize or control the direction of travel of an aircraft or a watercraft. It can be used to provide lift for an aircraft or sideforce for a sailing craft. It has application in the design of a wide variety of aircraft components and of various aerodynamic devices for fluid machinery.

2. Description of the Prior Art

The present invention deals with the design of airfoil sections and wings for a variety of applications. As outlined herein, the principles of design of airfoils and wings for operation in a subsonic flow of a gas such as air are the same principles used to design foil sections for application to incompressible fluids such as water. Therefore the present disclosure will deal with the design and operation of airfoil sections and wings in both gases and incompressible fluids and the application of these devices to aircraft, watercraft and fluid machinery. The general term fluid will be used to refer to either a gas or a liquid. The term airfoil or its equivalents, airfoil section and foil, will be used to describe a streamlined shaped profile designed for operation in either a gas or a liquid. The term wing will be used to describe a structure of finite span whose cross-sections are airfoil sections designed for operation in a gas such as air, where it may serve as an aircraft wing, a vertical stabilizer or other aircraft control surfaces, or such a structure designed for operation in a liquid such as water where it may serve as a keel, centerboard or rudder for a watercraft, or a fin for a sailboard. The present invention may also be applied in the design of blades for rotating machinery in air, such as a fan, a wind turbine or a helicopter rotor, or for rotating machinery in a liquid, such as a propeller in water or for general applications in the design of fluid machinery.

The lift on an airfoil section is defined as the force in the plane of the section perpendicular to the oncoming flow direction; the drag on an airfoil section is defined as the force in the plane of the section in the direction of flow. Airfoil sections have a wide variety of applications: providing lift to an aircraft, providing sideforce to a stabilizing device such as the centerboard of a watercraft, and obtaining thrust and transferring power to or from a blade in a fan, wind turbine or propeller. In all of these applications, the forces provided by the various devices, the wing, the centerboard, and the blade are derived from the lift and drag of the individual airfoil sections. Therefore, in the disclosed invention, we will refer to the forces generated by the airfoil sections as lift and drag forces even though in application these give rise to sideforce and thrust as well as lift and drag depending on the geometry of the application.

It is well known that, to achieve efficient subsonic aerodynamic performance at a given design point, airfoil sections should be designed with a combination of camber (curvature of the airfoil centerline) and angle of attack (attitude to the wind). Modern high-lift airfoils obtain comparable portions of their total lift from camber and angle of attack. A well designed cambered airfoil section will produce the same lift with a lower drag penalty than a symmetric airfoil section.

This presents a problem to the designer of an airfoil section for a craft which must operate in a symmetric manner, such as a sailboat which must operate equally well on both tacks. For such applications, the predominant prior-art airfoil designs have been of two types: rigid symmetric airfoils, such as are used for keels, rudders, vertical stabilizers, and centerboards; and flexible snap-through camber devices such as sails, which have an excess material with little inherent stiffness that assumes a curved shape under load, or thick airfoils with flexible skins, which have a pre-determined shape under load due to internal structure and linkages. When an angle of attack of operation is selected and load is generated, both of these devices snap through to a predetermined fixed non-symmetric aerodynamic shape, providing some load due to the curvature or camber of this excess material or non-symmetric shape.

For these airfoils, additional increments of load are provided primarily by changes in angle of attack and this load is accompanied by strong negative pressure peaks near the leading edge of the airfoil. If operation at high lift coefficients is required, such airfoils are prone to stall and, for operation in water, to ventilation and cavitation. It is an aspect of the present invention to provide devices which are resistant to stall and ventilation.

Such snap-through airfoil section designs operate poorly at zero angle of attack where the lift force is not sufficient to force them to take their designed cambered shape. For a sail with excess material, operation at low angles of attack produces flutter and vibration; for a flexible airfoil section with internal linkages, it is likely that low lift will be accompanied by vibration leading to high drag and fatiguing of mechanical structures.

There exist many prior art devices which achieve the benefits of lift due to camber by employing variable camber and/or changes in the cross-sectional shape of the airfoil sections. Aircraft wings are designed with a plurality of rigid sections, such as leading and trailing edge flaps, which are deployed as required to increase the effective camber of the airfoil, thereby providing increased lift. Most airfoil sections designed for aircraft are not required to operate symmetrically at both positive and negative angles of attack producing positive and negative loads. Rigid airfoils for aircraft wings can be designed with initially cambered centerlines. Additional changes in camber can be accomplished with actuating machinery, say by lowering the leading and trailing edge flaps. This requires intervention of the pilot or an active control system.

It is an aspect of the present invention that this change in airfoil section geometry is accomplished passively, that is without employing any actuating machinery in response to the aero/hydrodynamic forces on the airfoil section, and that this change in airfoil geometry occurs equally well for positive and negative load.

For watercraft, several designs for variable camber devices have been proposed wherein the effective camber shape is adjusted by pumping fluid or causing fluid to be pumped into flexible reservoirs on either side of a rigid central surface, or otherwise deploying flexible surfaces on either side of a rigid support structure, often with a variety of internal linkages. Such designs are extremely complex and limit the benefits of camber that can be achieve because of the rigid central section which constrains the travel of the foil centerline.

Each of the prior art, variable-camber devices share several of the following characteristics that differ from the present invention: the flexible surface is deployed about a central rigid structure located on the undeformed centerline of the airfoil section, limiting the deflection of the airfoil under load; the deflection of the airfoil is not proportional to load over a substantial range of load, so that it deflects to a fixed limiting shape at small loads; the surface of the airfoil is discontinuous, with layers of the skin free to slide, forming discontinuities in the surface slope; the flexibility of the airfoil is not chosen with a relationship to the dynamic pressure of the flow. It is an aspect of the present invention to overcome these limitations of prior art devices.

There are unresolved questions regarding the aeroelastic stability of prior art devices; for sufficiently high flow speeds, such devices will become unstable and behave in an uncontrollable manner. Such instabilities are of two types. The first is static aeroelastic divergence, where the flexible shape deforms uncontrollably. These high deflections can lead to undesirable aerodynamic shapes, leading to high drag forces. The second instability is flutter, an unstable vibratory motion which will occur for a flexible surface operating at sufficiently high speeds relative to the stiffness of the flexible surface. Flutter can lead to high drag, fatigue of mechanical surfaces, and catastrophic failure of the airfoil system. The designer of flexible devices for use in a flowing medium must take such instabilities into account when choosing the elastic properties of the flexible surfaces.

The present invention also has application in the design of various aircraft components such as helicopter, wind turbine and fan blades. These blades are currently designed with rigid airfoil sections. The performance range of such devices is limited by the stall of the blade sections. The airfoils described here postpone stall to higher loadings while having good aerodynamic performance at light loading where the blade chamber will be small. Other applications include aircraft horizontal stabilizer and rudder surfaces; application of these airfoils leads to enhanced aircraft stability and control authority in comparison to the current rigid control surfaces. Alternatively, smaller control surfaces of the same effectiveness as large rigid surfaces can be used resulting in reduced drag.

SUMMARY OF THE INVENTION

The present invention provides a flexible, elastic airfoil section for a wing or blade such that the lift force on the wing is obtained with a cambered deflection of the airfoil centerline that increases proportionately to the lifting load due to the elasticity of the airfoil The wing is ideally designed to be pivotably mounted to a supporting structure by means providing pivot axes for the airfoil sections near their leading and trailing edges, and incorporating means to permit the airfoil to slide in a direction along its undeformed centerline. An elastically deformable airfoil section for a wing or a blade is disclosed with a streamlined shaped profile section chosen for a specific application using considerations such as those outlines in Ref. 1. (Theory of Wing Sections; Abbot and Von Doenhoff, Dover Press 1959). For a given application, the required elastic properties of the airfoil are achieved through the selection of materials and the mechanical design of the airfoil cross-section. A variety of preferred elastic airfoil designs are disclosed.

A flexible wing or blade constructed utilizing the disclosed elastic airfoil sections has a critical dynamic pressure $q_{crit}$. Dynamic pressure is given by $a=(\frac{1}{2})\rho U^2$, where $\rho$ is the density of the fluid and U the fluid velocity. For operation in a given fluid medium, say air or water, both $U_{crit}$ and $q_{crit}$ are referred to as properties of the airfoil section. Operation of the flexible wing or blade at dynamic pressures at or above $q_{crit}$ results in full cambered deflection of its airfoil sections in response to the smallest non-zero angle of attack with respect to the flow. In this condition, the airfoil acquires some of the undesirable characteristics of the prior-art snap-through airfoils previously discussed, with degraded aerodynamic performance. Airfoils designed according to the present invention are designed to operate at speeds near but below their critical, for which they will obtain the benefits of lift due to camber in a proportional, controlled manner. For the preferred embodiments of the present invention, the critical speed is determined by the static aeroelastic divergence boundary, at which condition the airfoil camber in the presence of flow grows until the geometric stop of the sliding means is reached or until large mid-plane tensions are created.

The calculation of the critical dynamic pressure of a flexible wing or blade comprising elastic airfoil sections and the prediction of the aerodynamic performance of the wing or blade requires the coupling of a flow analysis to a structural analysis. Calculations have been done which confirm the behavior described and specific results appear below. The present invention thereby provides the designer with the means to design flexible wings for a variety of applications.

Several important benefits are provided by the present invention. At a given speed, the relative proportions of lift on the airfoil section obtained from both camber and angle of attack are roughly constant. Thus, increased lift requirements can be met with smaller changes in angle of attack to the oncoming flow than is required for a rigid airfoil section with a fixed camber. As an example, utilizing the present invention, a sealing craft can achieve the required lateral resistance from a centerboard at lower values of leeway angle than using a rigid foil, a definite benefit to the efficiency of the craft.

In addition, the pressure distribution on the airfoil has a favorable shape. For a rigid airfoil section with fixed camber, the pressure distribution is determined in part by camber and in part by the angle of attack. For a rigid, cambered foil, the part due to camber is essentially fixed and independent of angle of attack changes. Additional lift is generated by increases in that part of the pressure distribution ascribed to changes in angle of attack. This pressure distribution has a large negative peak near the leading edge of the airfoil section. Such a pressure peak (and the adverse pressure gradient that accompanies it) leads to flow separation, stall and, for operation in water, can trigger ventilation or cavitation. The pressure distribution of a cambered airfoil section is more resistant to separation, ventilation and cavitation. If desired, the details of the pressure distribution can be controlled by tailoring the stiffness distribution along the chord of the airfoil section so as to control the cambered shape.

The required stiffness of the airfoil section for a specific application may be achieved in many ways. In one embodiment a single material of specific elastic properties, for example a plastic or rubber elastomer, with properties chosen for the specific application (size, speed, fluid medium) is molded or otherwise shaped to take on an airfoil shape. Another possibility would be to construct a central spine of a relatively stiff material and surround it with a more flexible material such that the resulting composite structure has the desired stiffness distribution and magnitude as well as an efficient aerodynamic shape. In another embodiment, a flexible airfoil body is surrounded by a skin of greater stiffness, which could be integral with the flexible body or could be fastened at the trailing edge and allowed to slide over the flexible body of the airfoil. Still a further embodiment employs stiff leading and trailing edge sections connected to a molded or otherwise shaped elastic material as described above. Additionally, an airfoil section may be made of elastic material in which a void or cavity of a specific shape is formed for the purposed of achieving both an efficient exterior aerodynamic shape and a desired stiffness distribution. This void or cavity could be filled with a material of elastic properties different from the airfoil body. Elements of these various embodiments may be combined in many ways to fulfil the purposes of the present invention.

A series of rigid sections joined together at axes between the sections to produce a single articulated airfoil section, and optionally incorporating torsion springs to provide a restoring force proportional to relative rotation between the sections can also be employed as an elastic airfoil. Also, various combination of rigid and elastic sections, joined together solidly or at axes between the sections, mounted to a supporting structure by means providing pivot axes, the axes between the sections and the mounting at the pivot axes being constructed with or without torsion springs, can be employed. The stiffness of the resulting structure and its mounting can be chosen in such a way as to fulfil the purpose of the present invention.

In a further embodiment a control surface flap of conventional design is incorporated into a wing made of elastic material. The axle of the control surface can serve as one of the pivot axis for the flexible airfoil section.

The present invention has application to the design of a wide variety of force generating appendages for watercraft. Devices such as centerboards and fins benefit from the enhanced side force and reduced leeway angle. Rudders benefit from the enhanced control effectiveness and the reduced drag. The present device can be incorporated into a keel for a yacht, and may also serve as a keel incorporating a control surface such as an attached rudder or tab.

The present invention may be employed in the design of rotating blades for a fan, wind turbine or helicopter rotor. In this case, the dynamic pressure of the flow at each blade section is a function of blade radial position. For these applications, the stiffness distribution along the span should be tailored so that ideally all of the sections operate below their critical speeds by the same proportion. However, because the blade deflections are constrained by elastic forces between radial stations, the overall performance will not be detrimentally affected if some of the airfoil sections operate above their critical speeds. For application to rotating machinery, leading and trailing edge pivot attachments can be mounted to the central blade supporting structure by conventional means and the elastic airfoil sections employed for the blade. Alternatively, a partial span elastic blade may be employed for a portion of the blade span, as for example the tip region. Application of the present invention will both enhance the high lift performance of the blades, which is currently limited by stall, and provide good aerodynamic performance at low lift coefficents.

The present invention may be employed for conventional aerodynamic surfaces such as aircraft wings and vertical stabilizers. It has particular application where the high lift performance of a configuration needs enhancement without the complexity of pilot intervention or an active control system, as in various sport aeroplanes such as ultralights, hang gliders and man-powered vehicles. It may also be used in combination with a conventional aerodynamic control surface such as a trailing edge flap, for enhanced control and increased lift.

The flexible airfoils, wings and blades disclosed herein can also be used as components in fluid machinery such as internal fins, guide vanes, and turning vanes.

BRIEF DESCRIPTION OF THE DRAWINGS

Further understanding of the principles and aspects of the present invention may be had by studying the accompanying figures wherein:

FIG. 27 shows a detail of a trailing edge axle and cavity;

FIG. 28 shows a sailboard in combination with a flexible fin;

FIG. 29 shows a design for the fin of a sailboard;

FIG. 30 shows the application to the centerboard of a catamaran;

FIG. 31 shows the stiffness curves for the foil of FIG. 32;

FIG. 32 shows the foil cross-section for the foil of FIG. 29;

DETAILED DESCRIPTION OF THE PREFERRED EMBODIMENTS

Referring now to FIGS. 1a, 1b, 2a, 2b and 3, illustrated are finite span wings which incorporate the principles of the present invention and show pivotable mounting of a flexible wing 102 to a supporting structure 104 incorporated into an aircraft, watercraft or other device employing the present invention by means providing pivot axes near the leading and trailing edges. To permit the airfoil to obtain a cambered shape proportional to load without induced tension along the airfoil midline, one or both of the pivot axes must incorporate means to permit the wing to slide in a direction generally aligned along the centerline 105 of the undeformed profile. For typical operation, the travel of this sliding means should be about 3% of the chord of the airfoil.

Figure 1A:
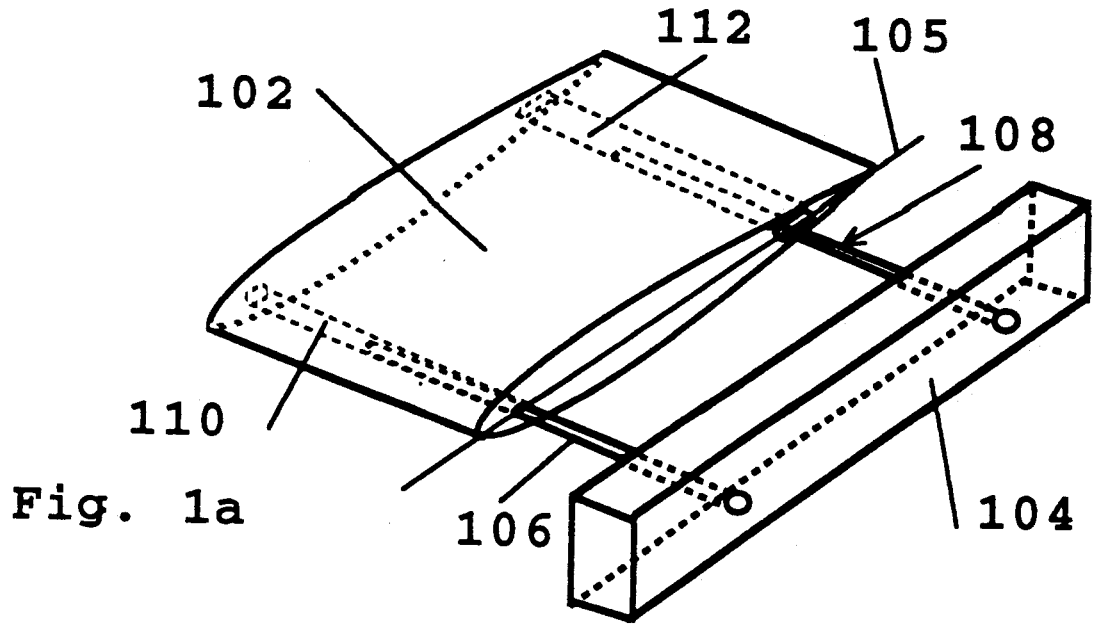
FIG. 1a shows a preferred embodiment of a flexible elastic wing containing a trailing edge slot mounted to a support structure on two rigid axles.
Figure 1B:
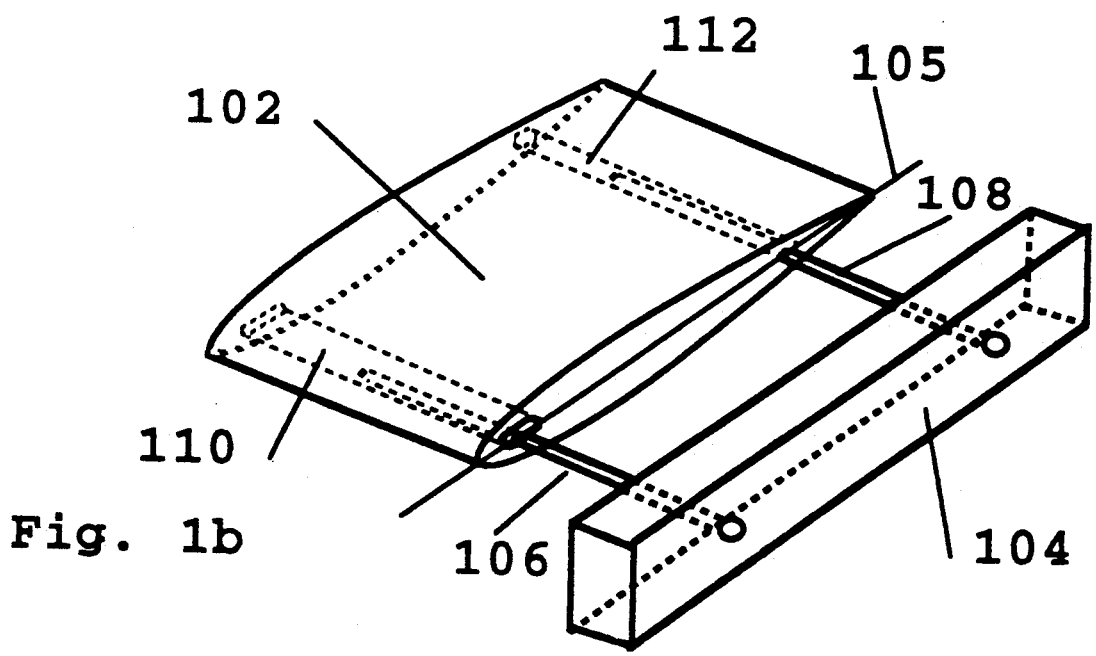
FIG. 1b shows a preferred embodiment of a flexible elastic wing containing a leading edge slot mounted to a support structure on two rigid axles.

In FIGS. 1a and 1b the pivot axis mounting means is provided by two axles, the leading edge axle 106 and the trailing edge axle 108, on which the wing 102 is mounted at axle cavities in the wing permitting rotation about the axles, a leading edge cavity 110 and a trailing edge cavity 112. The sliding means is realized by extending one cavity in the direction of the airfoil centerline 105 to permit deflection of the airfoil centerline without strong resistance from the axles. FIG. 1a shows an elongated trailing edge cavity 112 incorporating a slot to serve this function. FIG. 1b shows an elongated leading edge cavity 110 incorporating a slot to serve this function. In this embodiment, the axles 106, 108 are rigid; another embodiment would employ axles rigid in bending in the direction perpendicular to the undeflected airfoil centerline 105 but flexible in bending along this centerline; the sliding means would then be provided by this flexibility.

Figure 2A:
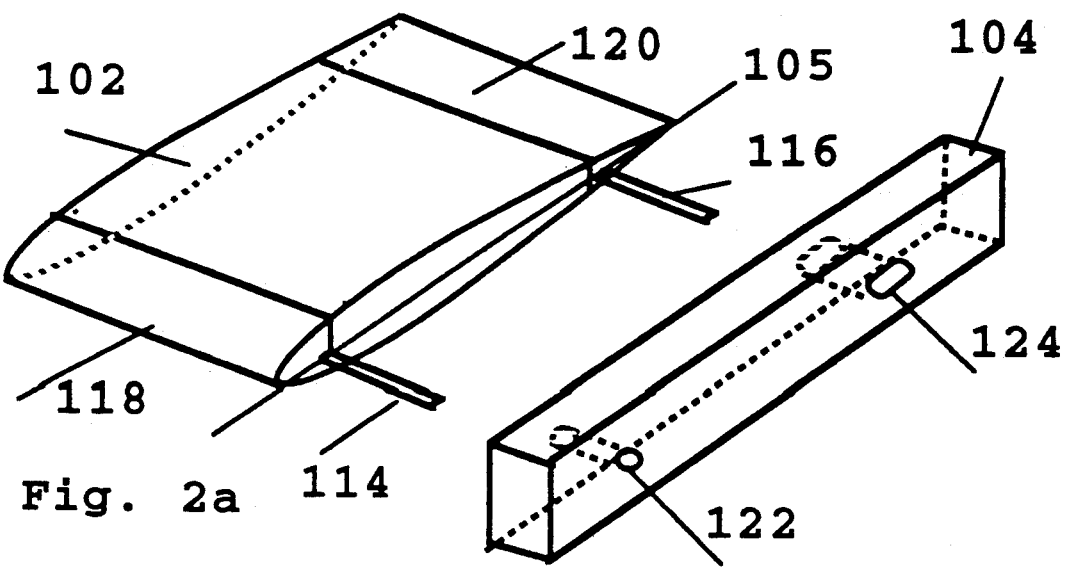
FIG. 2a shows a finite wing with leading and trailing edge attachments inserted into cavities in a support structure, the trailing edge cavity incorporating a slot.
Figure 2B:
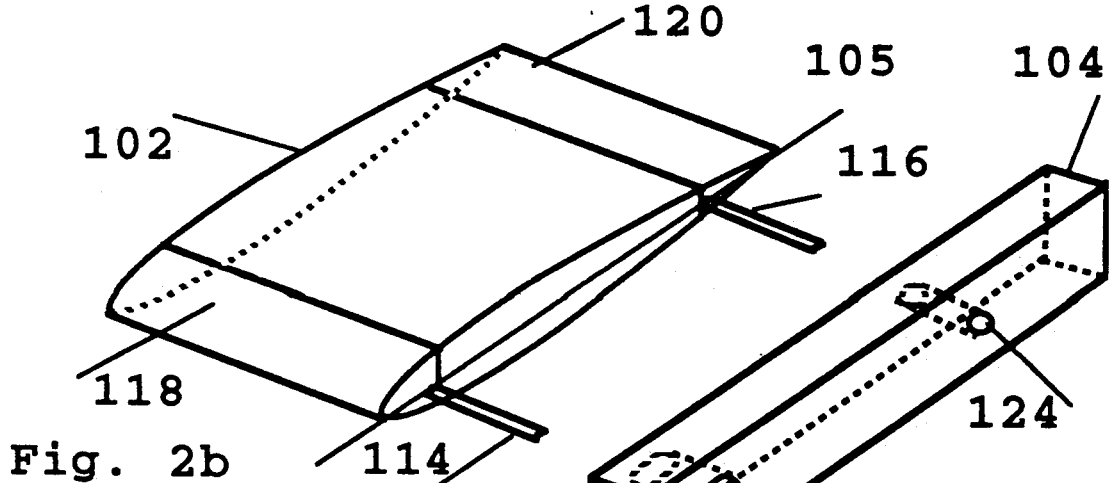
FIG. 2b shows a finite wing with leading and trailing edge attachments inserted into cavities in a support structure, the leading edge cavity incorporating a slot.

In FIGS. 2a and 2b an embodiment is shown where the pivot axis mounting means for the wing 102 are provided by rigid axle attachments 114 and 116 integral with the leading edge 118 and trailing edge 120 respectively of wing 102 which are made of relatively stiff material to resist bending deformations in the direction perpendicular to the wing under load. These axles are then inserted into a leading edge cavity 122 and a trailing edge cavity 124 in the supporting structure 104. In FIG. 2a the sliding means is provided by a slot in the supporting axle cavity at the trailing edge 124. In FIG. 2b the sliding means is provided by a slot in the supporting axle cavity at the leading edge 122. The axles are fastened in the support structure 104 by conventional means not shown in a manner permitting their rotation.

Figure 3:
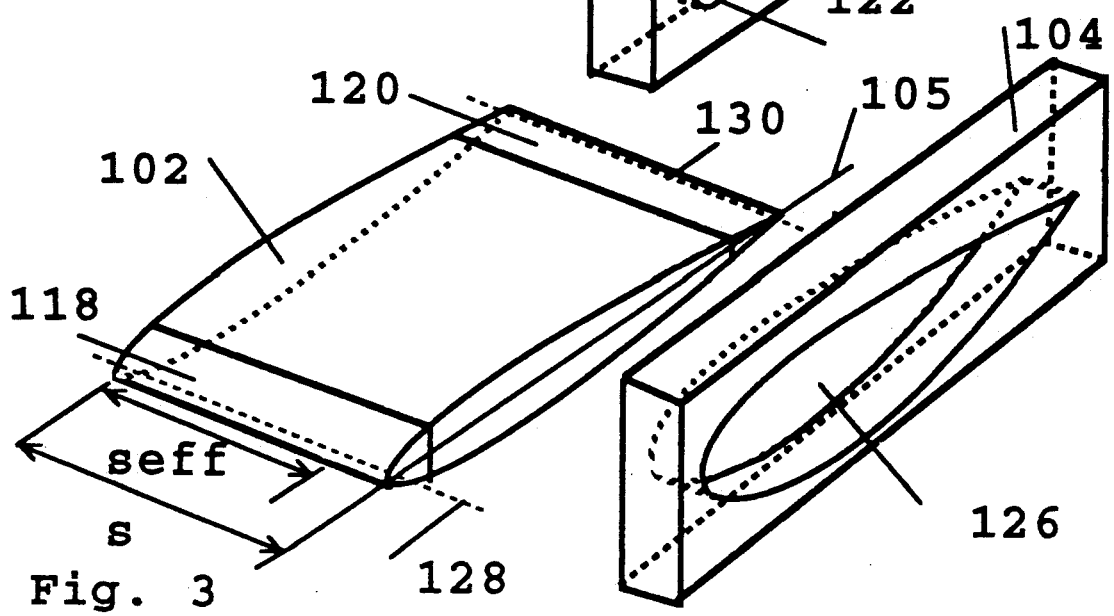
FIG. 3 shows a finite wing mounted in a shaped cavity in a support structure.

FIG. 3 illustrates a further embodiment in which the leading and trailing edge pivot mounting means and the sliding means are provided by mounting wing 102 of span s in a shaped cavity 126 in the support structure 104. The wing so mounted has an effective span $s_{eff}$ exposed to the flow. In its deflected position the wing would bear against the cavity 126 at positions near its leading and trailing edges for structural support, which positions then provide pivot axes 128 and 130 about which the wing can rotate. In this embodiment, the leading edge 118 and the trailing edge 120 of the wing should be made of relatively stiff material.

Figure 4:
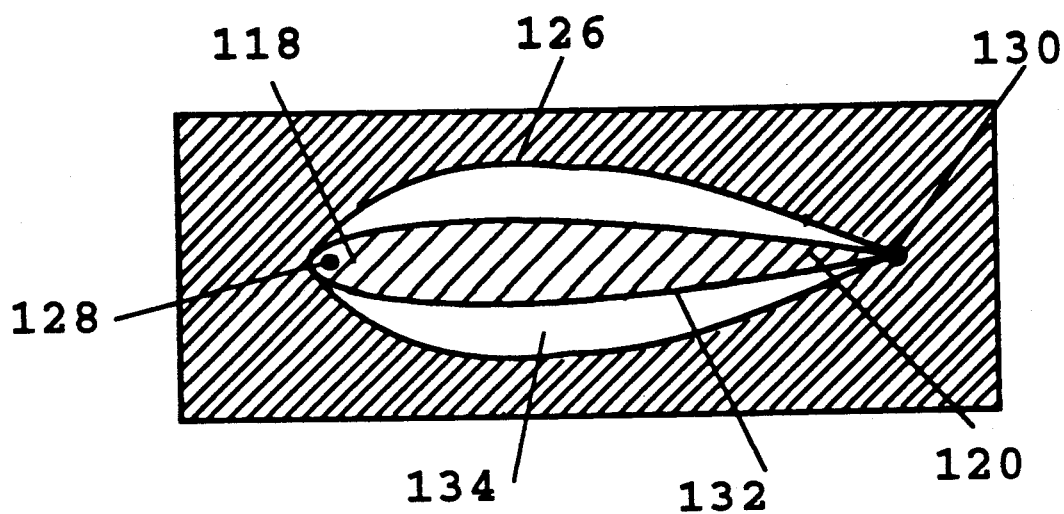
FIG. 4 is a cross-section through the support cavity of FIG. 3.

FIG. 4 shows a cross-section through the cavity showing the airfoil section 132 mounted in the cavity. In this case the pivot axes for airfoil rotation are provided by the internal shape of the support cavity 126: the leading edge pivot axis 128 is substantially at the center of curvature of the leading edge section of the cavity; and the trailing edge pivot axis 130 is essentially at the trailing edge of the foil. The wing is supported in the cavity by conventional means appropriate to the application; these are not shown. Such mounting means can also incorporate the axles of FIG. 1 or 2 to provide rigid support and fixed axis locations. For example, it may be desired to mount the wing so as to fix the location of the leading edge pivot axis. Other embodiments of this concept are possible within the scope of the invention. The cavity 126 may contain a flexible material 134 to provide a smooth surface for contact with the flow.

The examples in FIG. 1, 2, 3 illustrate but do not limit the possible pivot axis mounting means that may be used for the present invention. In particular, the concepts shown may be combined together in several ways to fulfil the purpose of the invention, such as utilizing an axle mounted to the support structure as the leading edge pivot mounting means while using an axle integral to the wing trailing edge as the trailing edge pivot mounting means.

Typical examples of materials suitable for construction of flexible wings according to the present invention include but are not limited to: urethanes and other synthetic rubbers, flexible plastics, elastomers, nylon, foam rubber and foam urethanes, and thin metal sheets such as aluminium. Various suggestions for airfoil design using materials of this type appear below.

Figure 5:
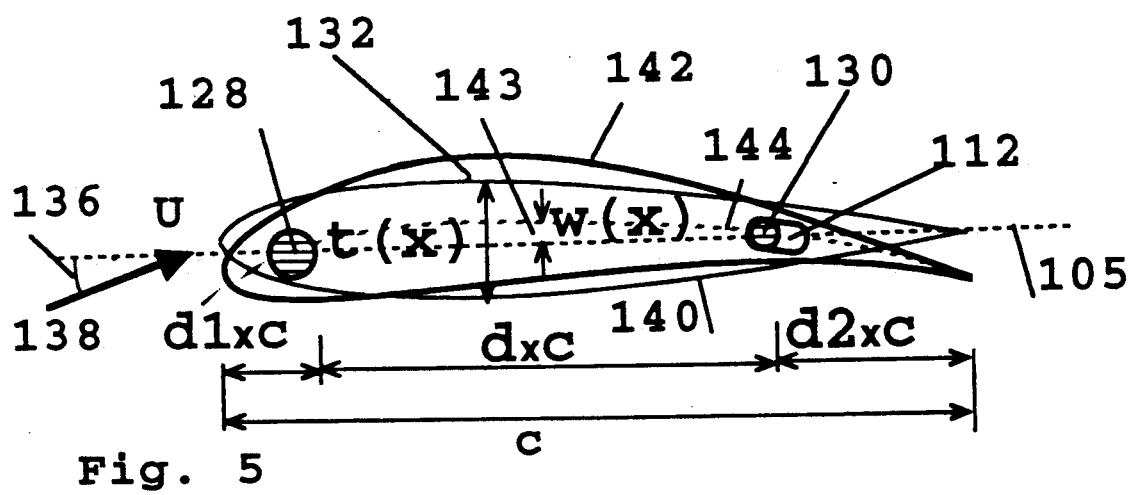
FIG. 5 shows the principle of operation of the foil with camber produced in operation at an angle of attack to the flow.

The principle of operation of the invention is shown in FIG. 5. When the flexible airfoil cross-section 132, of thickness $t(x)$ and chord c, passively mounted at pivot axes near the leading and trailing edges 128 and 130 respectively, is placed at an angle of attack 136 to a flowing medium 138, the resulting aero/hydrodynamic load will deform its surface contour from its undisturbed position 140 to an equilibrium deflected position 142. The camber deflection $w(x)$ 143 is the distance between the undeflected centerline of the airfoil 105 and the deflected centerline 144. For a given angle of attack 136, the magnitude of the deflection is determined by the foil stiffness, flow dynamic pressure, and pivot axis locations. The distance between the pivot axes is $d^*c$, the distance between the leading edge and the leading edge pivot axis is $d_1^*c$; the distance between the trailing edge and the trailing edge pivot axis is $d_2^*c$. The sliding means, shown as a slot in the trailing edge cavity 112, acts to insure that the deflection of the airfoil takes place in proportion to the load without substantial mid-plane tension. It is a benefit of the present invention that the aerodynamic load will be greater than that of the undeformed section for the same angle of attack, flow speed, and flowing medium. A substantial portion of this load will be provided by the airfoil camber. Because the camber increases in proportion to the load, the airfoils disclosed in the present invention have a lift curve slope greater than that of a rigid foil. (Lift curve slope for an airfoil or a wing is the rate of increase in lift for an increase in angle of attack to the flow.)

Figure 6:
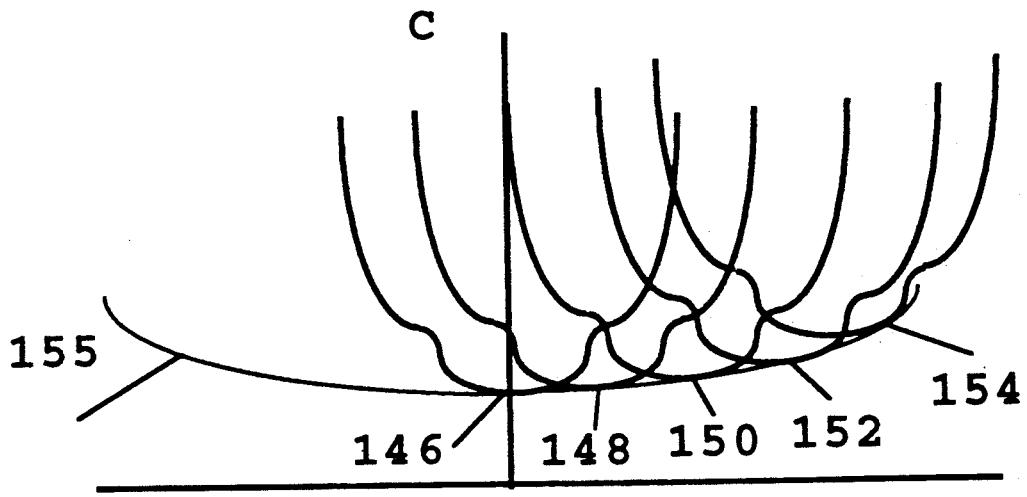
FIG. 6 shows the aerodynamic performance of a family of prior art rigid airfoils of varying camber.

The beneficial effects of camber can be understood from FIG. 6 which presents a family of curves showing typical behavior of the drag coefficient $C_d$ vs the lift coefficient $C_l$ for a family of rigid airfoils with the same thickness distribution but differing amounts of camber. ($C_d$=Drag/unit span/($\frac{1}{2} \rho U^2 c$); $C_l$=Lift/unit span/($\frac{1}{2} \rho U^2 C$); c is the length of the airfoil chord) Curve 146 is for an airfoil with no camber; curve 148 for a small camber; curve 150 for more camber; with airfoil camber continuing to increase to curve 152 and 154. As can be seen, each rigid airfoil section has a region of low drag (called a "drag bucket") which occurs at a $C_l$ that increases with camber. The center of this low drag region can be considered to be the optimum design point of the airfoil section. Each cambered airfoil section has a region of higher drag for $C_l$'s both lower and higher than its design point. Thus for a given $C_l$, a camber can be selected which minimizes the drag. Consequently, cambered airfoils can provide lift at lower drag than symmetric airfoils especially as the required lift coefficient increases. With a flexible, elastic airfoil section that increases its camber in proportion to its lift coefficient it is possible to move along the envelope 155 of the low drag portions of these curves and in effect to remain in the "drag bucket" over the operating range of the airfoil section. In one analysis of airfoil performance, the lowest drag for a given lift occurred for an elastic airfoil section having a lift curve slope roughly twice the value of a rigid foil.

a) airfoil sections

A preferred embodiment of the present invention is to mount a flexible wing or blade to a supporting structure by means of two rigid pivot attachments, located near the leading and trailing edges of the foil. The airfoil sections of the wing or blade are constructed primarily of a flexible, elastic material so as to provide a deflection of the wing surface in proportion to the load which in combination with rotation about the pivot axes provides an efficient cambered airfoil section. The external shape of the airfoil can take a variety of forms consistent with the principles of airfoil design as outlined in Ref. 1. The exterior profile of the airfoil shape of the present invention forms a smooth continuous curve such that points on the surface initially adjacent remain in contact.

Figure 7:
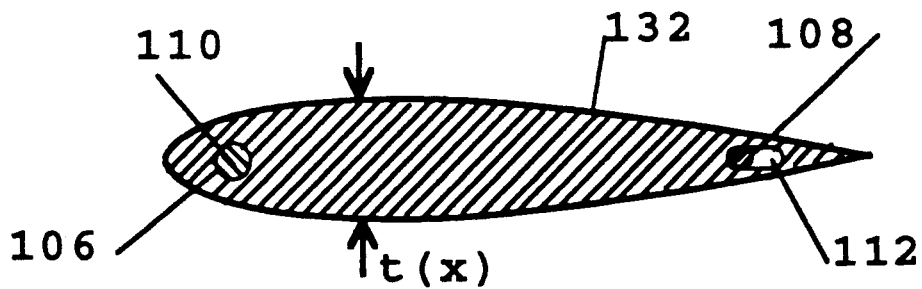
FIG. 7 is a cross-section of an embodiment of the invention showing an airfoil shaped out of flexible material.

Referring again to the drawings, FIG. 7, 8, 9, 10, 11, 14 and 15 illustrate airfoils which incorporate the principles of the present invention. FIG. 7 shows an embodiment of the present invention in which the airfoil cross-section 132 of thickness $t(x)$ is molded out of a uniform flexible material such as a urethane or other elastomer. The airfoil is mounted on two rigid axles providing pivot axes mounting means, a leading edge axle 106 and a trailing edge axle 108, said axles being inserted into leading and trailing edge cavities, 110 and 112 respectively, molded into the airfoil cross-section, the trailing edge cavity 112 incorporating a slot to provide the sliding means.

Figure 8:
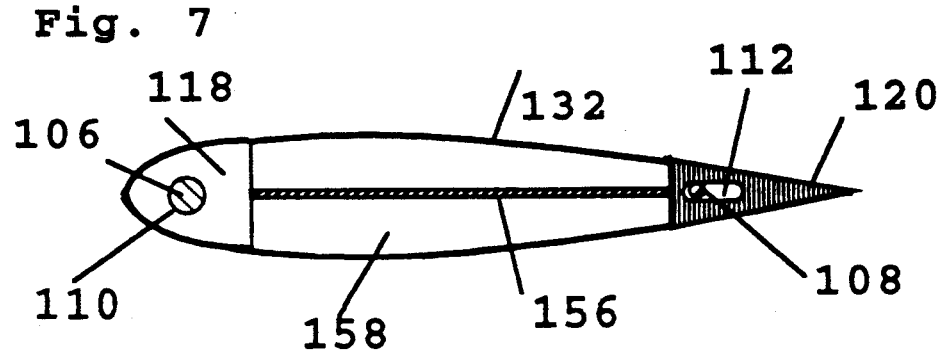
FIG. 8 is an embodiment showing a stiff central spine surrounded by flexible material.

FIG. 8 shows an embodiment in which an airfoil section 132 incorporates a spine 156 to provided some of the required stiffness, a leading edge 118 and a trailing edge 120 of relatively stiff material, incorporating axle cavities for the leading and trailing edge axles 110, 112 surrounded by a flexible material 158 to form the profile shape. As one embodiment the airfoil shown here is mounted on leading and trailing edge axles 106, 108 to provide the pivot axis mounting means. In the most beneficial application of this alternative, the spine 156 would be manufactured of a stiffer material than the airfoil body 158.

Figure 9:
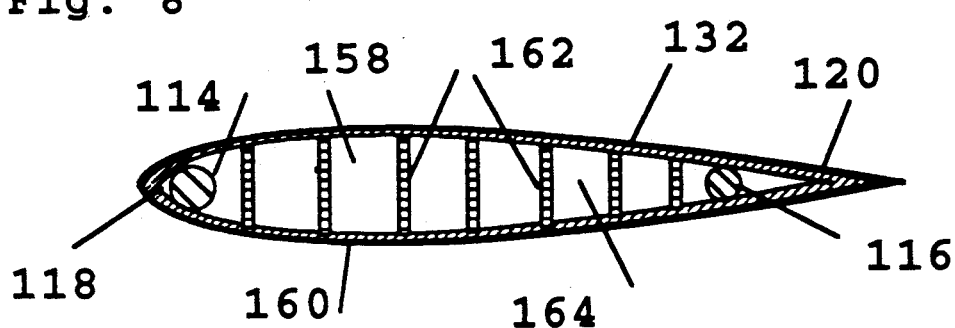
FIG. 9 is an additional embodiment showing a stiff skin surrounding a core of flexible material.

FIG. 9 shows an embodiment in which the flexible material 158 of the airfoil section 132 is surrounded with a skin of stiffer material 160 which may be free to slide over the flexible body except at the trailing edge. As one embodiment, ribs 162 can be incorporated into the airfoil to provide additional structural stability. In this case, the region between the skin and the ribs may be a void 164. The pivot axis mounting means (not explicitly shown) is provided by axles integral to the airfoil 114, 116 incorporated into the wing leading and trailing edges 118 and 120.

Figure 10:
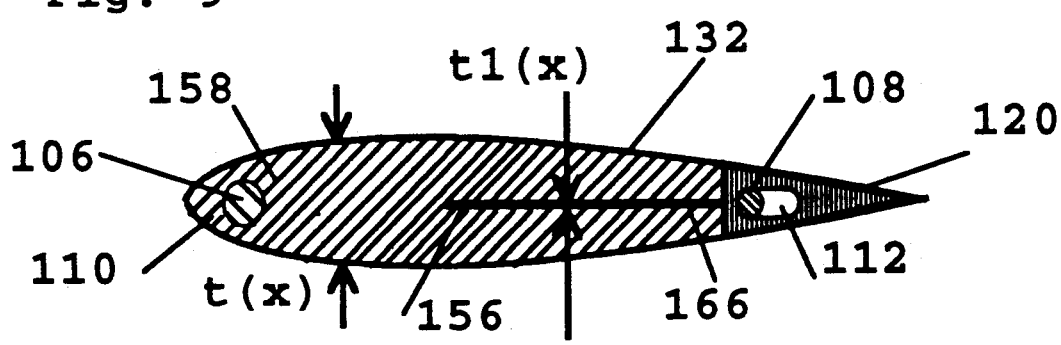
FIG. 10 is a preferred embodiment of a flexible elastic airfoil showing a part chord spine, a stiff trailing edge, and a flexible airfoil body.

FIG. 10 shows a flexible airfoil section 132 of thickness $t(x)$ made primarily of flexible material 158 incorporating a spine unit 166 with a trailing edge section 120 and a central spine 156 of thickness $t_1(x)$ that extends over part of the chord. The pivot axis mounting means are provided by incorporating cavities 110, 112 into the airfoil at its leading and trailing edges and pivotably mounting the airfoil on leading and trailing edge axles 106, 108.

Figure 11:
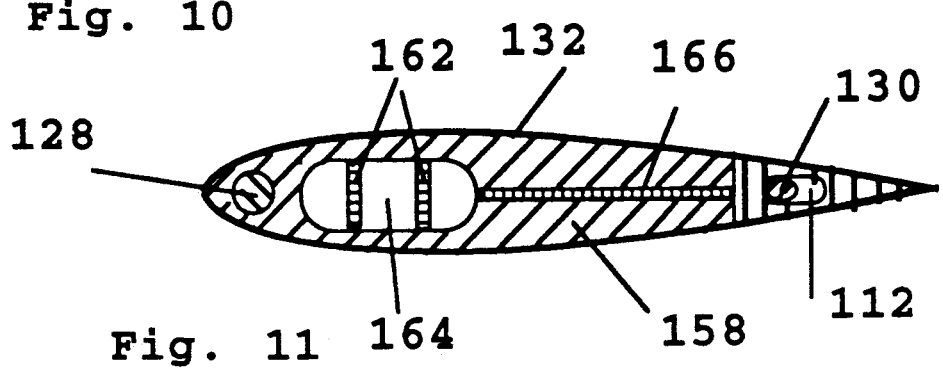
FIG. 11 is an additional embodiment containing a cavity and showing a leading and trailing edge of alternate materials.

FIG. 11 shows an additional embodiment in which the central portion of the flexible airfoil 158 contains a cavity 164 designed to tailor the stiffness distribution to a desired form, and also incorporating the spine unit 166 of FIG. 10. The cavity 164 may be empty or filled with elastic material differing from that of the airfoil body 158 and may incorporate ribs 162. The airfoil is mounted at pivot axis 128 and pivot axis 130 incorporating a sliding means in the form of a trailing edge cavity slot 112.

Figure 12:
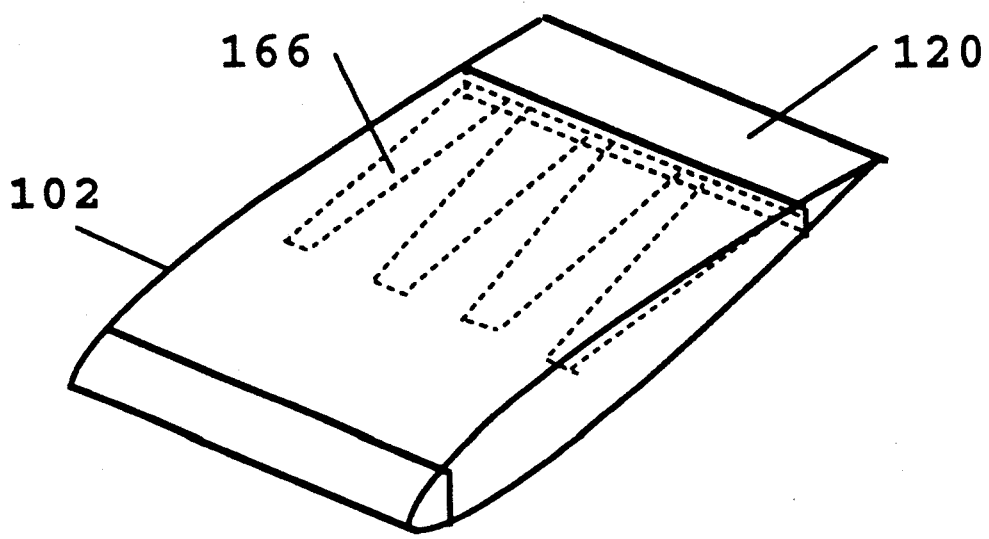
FIG. 12 shows shaping of the spine in the spanwise direction.
Figure 13:
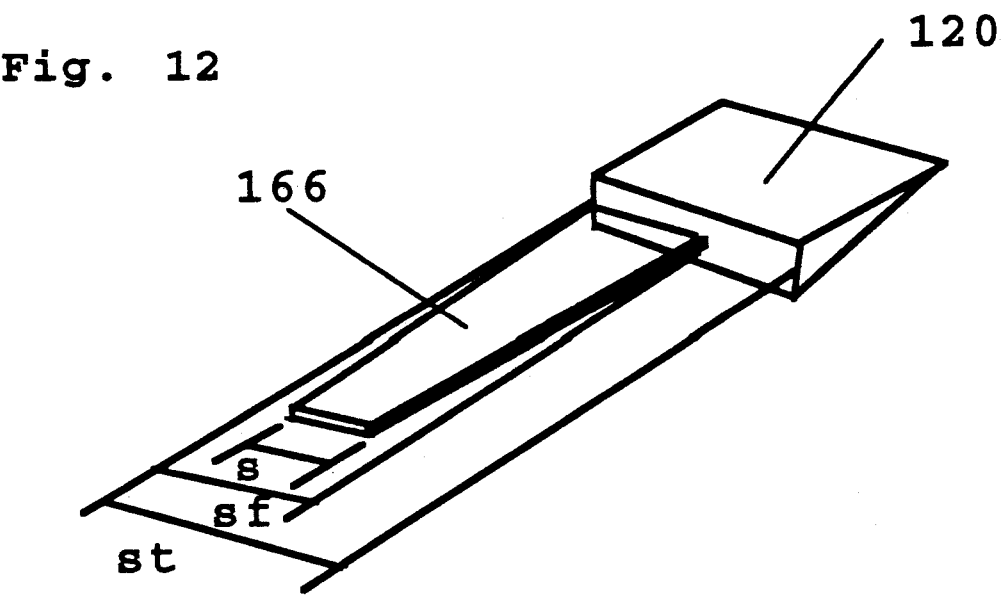
FIG. 13 shows a detail of a spine unit.

Although the control of airfoil stiffness distribution may be done by suitable choice and placement of materials in the airfoil cross section, it is also possible to control stiffness by suitable shaping of material in the direction of the wing span. FIG. 12 shows the wing 102 containing a spine unit 166 incorporating a trailing edge 120 and discloses shaping the planform of the spine unit to achieve a desired stiffness distribution. FIG. 13 shows a detail of the spine unit 166. The spine at its leading edge occupies a fraction $s_0$ and at its trailing edge occupies a fraction $s_f$ of the total width of the spine $s_t$.

Figure 14:
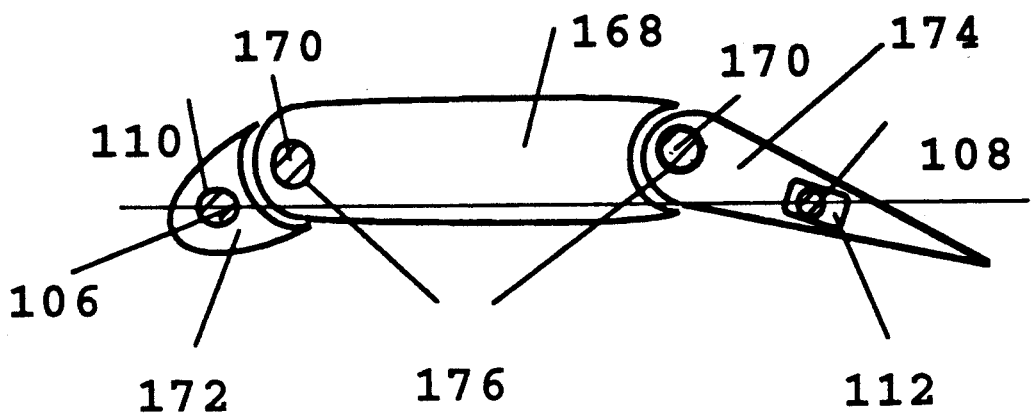
FIG. 14 shows an embodiment wherein rigid sections are elastically joined to form an embodiment of the invention.

FIG. 14 shows an embodiment of the elastic airfoil in which the airfoil is constructed of rigid sections 168 which are joined together to form a single articulate unit at axes 170 allowing relative rotation between the sections. Shown is a three segment airfoil consisting of a leading edge section 172, a trailing edge section 174 and a center section 168, mounted on leading and trailing edge axles 106 and 110 enclosed in axle cavities 110 and 112. The required elastic restoring forces are provided by torsion springs 176 of which there must be a number at least equal to the number of axes joining the sections. These springs may be located at the axes between the sections to provide a restoring torque in response to relative rotation between the sections and/or t the pivot axis location(s) 106, 108 to provide a restoring torque to rotation between the airfoil and the support structure. The torsion springs are of conventional design and their details are not shown.

Figure 15:
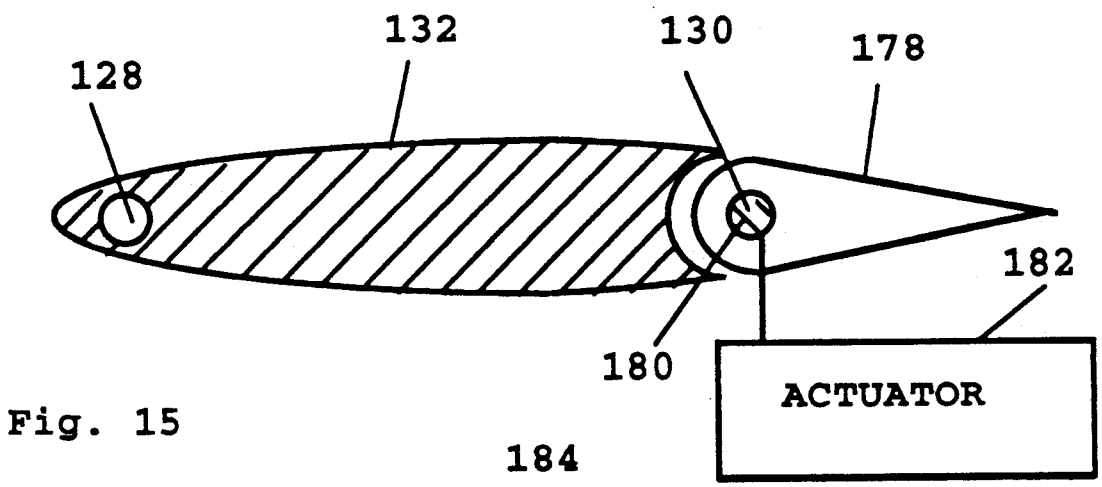
FIG. 15 shows a flexible airfoil with a conventional flap.

FIG. 15 shows a flexible airfoil section 132 in combination with a control surface of conventional design 178 having a axis 180 and an actuating means 182. The airfoil is mounted at a leading edge pivot axis 128, and at a trailing edge pivot axis 130 which may be incorporated into the control surface axis 180.

It will be understood that the specific airfoil designs given here do not limit the form of the invention but are illustrative of its application. Also, the airfoils shown in FIG. 7 through 11 achieve the pivotable mounting to the support structure by pivot axis, sliding means combination primarily through mounting the airfoil section on rigid axles in axle cavities, one of which is elongated, as is illustrated in FIG. 1. Other embodiments of pivotably mounting the airfoil, wing or blade to the support structure including but not limited to those shown in FIG. 1, 2 and 3 and other means previously disclosed can be used according to the present invention.

b) effective stiffness of airfoil sections and finite wings

The methods of analysis of the deflection of flexible, elastic airfoils constructed of various structural elements as are shown in FIG. 7 to 14 under a prescribed static load in the absence of flow are well known to those skilled in the art. In the present disclosure, the effective section stiffness $S_s$ of an elastic airfoil section is defined as follows, with respect to FIG. 16: for a two-dimensional section, a concentrated load 184 of magnitude p (p=P/s, force per unit span) is applied at a point Q 186 located on the airfoil surface midway between the pivot axes 128, 130. The elastic airfoil section deflects from its initially undeformed position 140 to its deformed position 142. The deflection w, 188, at the point Q is then determined. For the elastic materials anticipated for use, w is substantially proportional to p for small deflections w/c<0.1 where c is the chord of the airfoil: that is w increases monotonically with increases in p such that w/p is substantially constant. The ratio p/w is defined as the effective section stiffness $S_s$ of a given airfoil.

Figure 17:
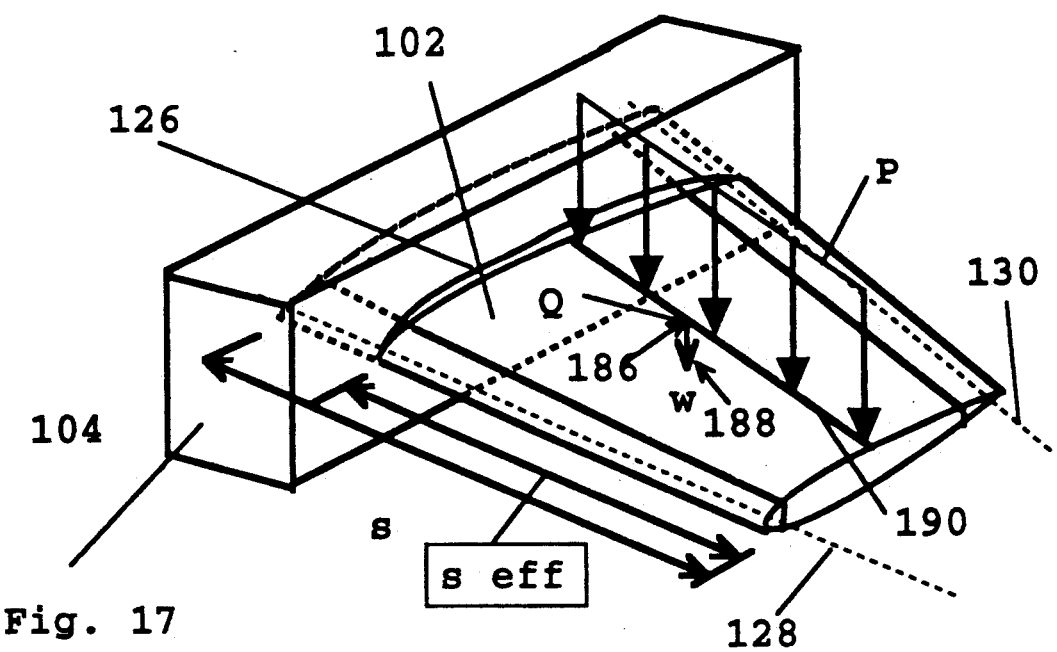
FIG. 17 shows deflection of a flexible wing by a static load P distributed along the span.

To define the effective stiffness $S_w$ for the wing of finite span 102 shown in FIG. 17, a total load P is uniformly distributed along a line 190 located midway between the leading edge pivot axis 128, and the trailing edge pivot axis 130 (or their linear extensions). This loaded line extends from the root to the tip of the wing along the effective span, defined as that portion of the span exposed to the flow $s_{eff}$. In this case the load per unit span is $P/s_{eff}$. The deflection w 188 is taken at the point Q, 186, located along this line midway along the span $s_{eff}$. The ratio $P/(s_{eff}w)$ so determined is defined as the effective stiffness of the wing, $S_w$. ($S_w = P/(s_{eff}w)$) If a wing extension is present, say for mounting in a cavity 126 in the support structure 104, the effective stiffness is determined by subjecting to load only the portion of the wing exposed to flow. For a wing of total span $s_{total}$, this increases the effective stiffness by a factor $(s_{total})/s$effective over that of a wing whose entire span is exposed to the flow.

Figure 16:
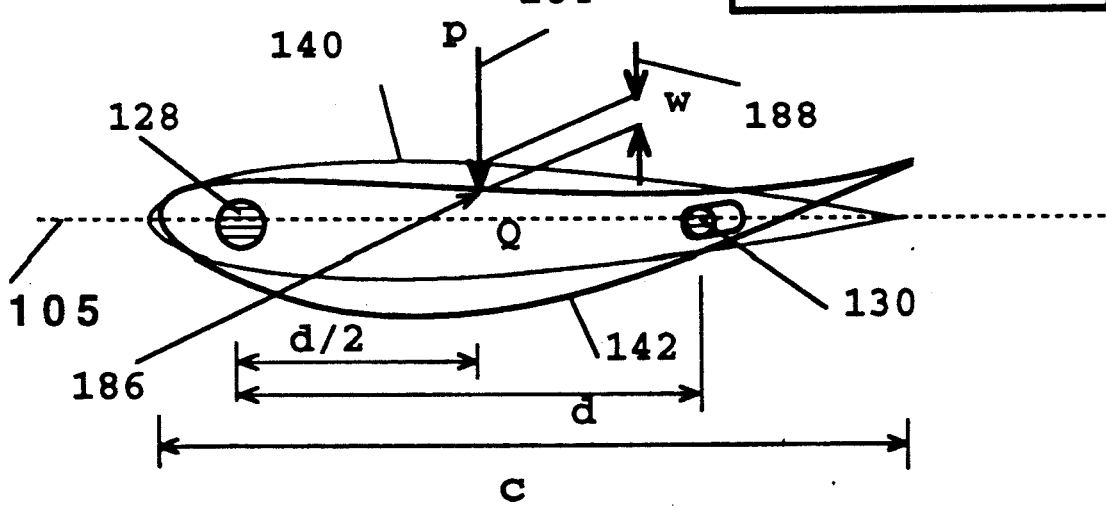
FIG. 16 shows the deflection of a flexible airfoil by a static load p.
Figure 18:
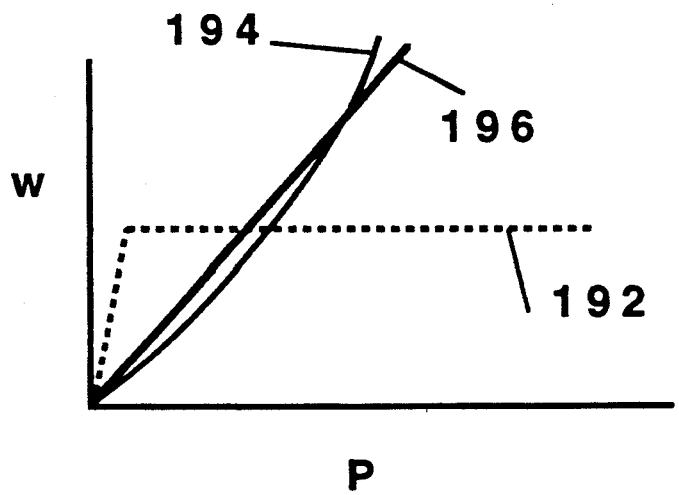
FIG. 18 shows deflection response w to load p.

The deflection of the airfoil according to the present invention as a function of load P in comparison to several prior art flexible wings is shown in FIG. 18. These prior art devices are designed to easily deflect under load until their deflection is limited by contact with a central support structure or other geometric stop, after which load the deflection w remains constant. This is shown by curve 192 of FIG. 18. The present invention has a proportional deflection over a much larger range than prior art devices and in particular is not limited by contact with a central support structure so that the point Q, 186, of FIG. 16 is free to pass through the undeformed centerline of the airfoil section, 105. Propostionality between load P and deflection w is shown by curve 194 of FIG. 18 which also shows that the curve of deflection is close to a straight line of best fit 196.

c) behavior of elastic airfoils in a flowing medium

The cambered shape of the midline of the airfoil w(x) as well as its critical dynamic pressure $q_{crit}$ are controlled by the pivot axis locations and by the magnitude and the distribution of stiffness along the chord of the airfoil. The coupled flow/structural calculation which determines the behavior of the airfoil in the flow requires the solution of the following equation in the region between the pivot axes, $$N \frac{d^2}{dx^2}\left(s(x)\frac{d^2}{dx^2}w(x)\right) = q\Delta c_p(x; w(x)/c; M; AR, \alpha)$$

where w(x) is the deflection of the airfoil centerline; $\Delta c_p(x; w(x)/c; M, AR, \alpha)$ is the distributed lifting pressure coefficient across the airfoil, which has a known dependence on the deflected shape of the airfoil relative to the chord length w(x)/c, the Mach number M, the aspect ratio AR, and the angle of attack $\alpha$; N is the local bending stiffness of the midchord section of the airfoil; and s(x) the stiffness shape function. This equation can be solved to determine the camber w(x) given the other parameters.

For a critical value of the parameter $K=N/(q(c/2)^3)$, solutions for $w/(x)$ from this equation become unbounded, corresponding to the condition of aeroelastic divergence. For a given stiffness shape function $s(x)$, M, AR, and location of the pivot axis, the critical value of K, $K_{crit}=N/(q(c/2)^3)$, has a specific numerical value. In applying the present invention to the design of elastic airfoil sections and wings the parameter K for the airfoil section should be above the critical value $K_{crit}$ over a substantial portion of the operating range.

Conversely, this equation may be used to design desirable airfoil section stiffness distributions to achieve a desired camber shape $w(x)$ for given operating conditions. In this case, this equation can be solved to determine the required stiffness shape function $s(x)$. (This procedure was followed in an example given below.)

Calculations indicate that the elastic airfoil will not operate properly if the distance between the pivot axes is substantially less than 60% of the chord of the airfoil section, nor with the leading edge pivot substantially aft of the 25% chord or the trailing edge pivot substantially ahead of the 60% chord. In these cases the deflection of the airfoil section under load is opposite to the desired effect producing a negative camber which will increase the drag for a given lift.

d) airfoil section behavior at low Mach numbers

Analyses of the behavior of various elastic airfoil sections have been carried out for a wide variety of stiffness shape functions and magnitudes, airfoil section geometries and pivot axis locations for both articulated and continuously flexible airfoil sections. For a particular elastic airfoil section the critical dynamic pressure is a function of pivot locations, stiffness shape function and stiffness magnitude.

However, it has been found that the critical dynamic pressure of an elastic airfoil section may be predicted by calculating, by standard structural analysis techniques, or by direct measurement, the effective stiffness $S_s=p/w$ of the elastic airfoil section as defined above. This finding greatly simplifies the task of designing elastic airfoils for a given application.

For elastic airfoil sections over a wide range of elastic and geometric properties, the critical dynamic pressure is found to be $$q_{crit}=A\,S_s=A\,p/w$$

where $q_{crit}$ is the dynamic pressure of the flow at the critical speed $U_{crit}$, $S_s$ is the effective section stiffness defined above, p the concentrated load per unit span and w the deflection at the load point Q. A is a coefficient whose value is in the range $0.09<A\leq0.12$ with a predominance of the data for realistic configurations lying near $A=0.1$. This result may be used to design airfoil sections possessing a desired $q_{crit}$.

Figure 19:
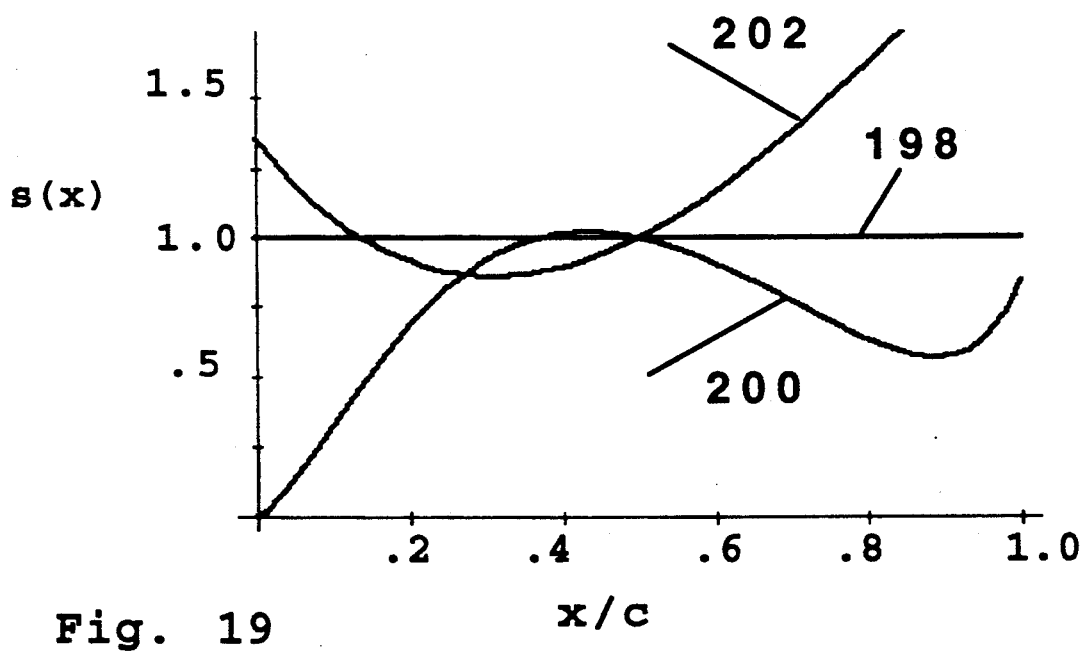
FIG. 19 shows various stiffness distributions along the airfoil chord.

However, to provide specific airfoils for use in applying the present invention, results will be presented for airfoils whose stiffness distribution is tailored to achieve the various stiffness shape functions $s(x)$ shown in FIG. 19. FIG. 19 shows several possible $s(x)$'s plotted as a function of $x/c$ where $x/c=0$ is at the airfoil leading edge and $x/c=1$ is at the airfoil trailing edge. For each distribution the total stiffness $k(x)$ is the product of the magnitude of the midchord bending stiffness N and the shape function $s(x)$ $$k(x)=N\,s(x)$$

where the stiffness shape function $s(x)$ always equals one at the airfoil midchord. With reference to the curves presented in FIG. 19, these stiffnesses are characterized as: 198 constant; 200 stiff midchord (MC) and 202 still trailing edge (TE). They are representative of various stiffness shape functions that can be employed for the present invention. The constant stiffness is $$s(x)=1$$

The stiff mid-chord (MC) distribution is $$s(x)=1.24\,x/c+32(x/c)^2-173\,(x/c)^3+448\,(x/c)^4-717\,(x/c)^5+717\,(x/c)^6-409\,(x/c)^7+102\,(x/c)^8$$

and the stiff trailing edge (TE) distribution is given by $$s(x)=1.35-3.4\,x/c+6.6\,(x/c)^2-2.4\,(x/c)^3$$

These functions are used to design the stiffness of the airfoil between the pivot axes; the leading and trailing edges beyond the pivots should be stiff.

Sample calculations of airfoil operation for these stiffness distributions in a fluid flow of dynamic pressure q have been done for the cases shown in Table 1. The results of these calculations give the critical parameter $K_{crit}=N/(q(c/2)^3)$. The effective stiffness coefficient A is also shown in Table 1.

TABLE 1

| $K_{crit}$ and A for various stiffness distributions; leading edge pivot at 10% c; trailing edge pivot at 80% c | | | |
|---|---|---|---|
| | constant | stiff MC | stiff TE |
| $K_{crit}$ | .574 | .552 | .577 |
| A | .0995 | .095 | .102 |

For an elastic airfoil designed with one of these stiffness shape functions, given N and the chord c, the critical dynamic pressure is determined as $q_{crit}=N/(K_{crit}(c/2)^3)$ with $K_{crit}$ given in Table 1 for the airfoil.

For a given airfoil, $K_{crit}$ is sensitive to the pivot axis locations and decreases as the distance between the pivot axis decreases. For pivot axis locations other than those of Table 1, if as is shown in FIG. 5 the distance between the leading edge and the leading edge axis 128 is d1*c and the distance between the trailing edge and the trailing edge axis 130 is d2*c (d1 and d2 being positive), then $K_{crit}$ for these various airfoils may be approximated for d1 and $d2<0.25$ to an accuracy of 10%.

| constant | $K_{crit}=1.3-2.6*d1-2.3\,d2$ |
|---|---|
| stiff MC | $K_{crit}=1.67-3.6\,d1-3.6\,d2$ |
| stiff TE | $K_{crit}=1.24-2.6\,d1-1.8\,d2$ |

These formulas should be used to apply the invention for axis locations other than those of Table 1.

The stiffness shape function of an airfoil made of layered materials in the manner described herein is determined by standard techniques. For example the stiffness shape function of an airfoil of uniform material of thickness $t(x)$, as shown in FIG. 7, is given by $$s(x)=(t(x)/t(c/2))^3$$

where c is the chord of the airfoil and $t(c/2)$ is the thickness of the airfoil at the midchord. The total stiffness of the airfoil is $$k(x) = \frac{1}{12(1-\nu^2)} E\, t(x)^3 =$$

$$Ns(x) = \frac{1}{12(1-\nu^2)} E\, t(c/2)^3 (t(x)/t(c/2))^3$$

where E is Young's modulus and $\nu$ is Poison's ratio, both being properties of the material.

For an airfoil section made of two materials, one being a spine of thickness $t_1(x)$ along the centerline, as shown in FIG. 10, with material properties $E_2$ and $\nu_2$, surrounded by a material of properties $E_1$ and $\nu_1$ to make a total section thickness t(x) the stiffness distribution k(x)=s(x) is given by $$k(x) = Ns(x) =$$

$$\frac{1}{12(1-\nu_2^2)} E_2 (t(x)^3 - t_1(x)^3) + \frac{1}{12(1-\nu_1^2)} E_1\, t_1(x)^3$$

The camber shape under load can be controlled by selecting the stiffness shape function s(x) so as to produce the desired camber deflection w(x) in response to the load distribution naturally occurring on the elastic airfoil. Tailoring the airfoil stiffness to achieve a desired s(x) for an arbitrary airfoil section of thickness t(x) is accomplished using the method illustrated by the following example.

The external shape of the airfoil section can take a variety of forms such as the many airfoil shapes given in *Theory of Wing Sections* by Abbott and Van Doenhoff which gives suggestions for the choice of airfoil section for a given application. For application to elastic airfoils which must work equally well at positive and negative loads, a symmetric airfoil section appropriate for the expected Reynold's number ($R_3 = U\,c/\nu$; $\nu$ being the coefficient of viscosity of the fluid) of the flow should be chosen.

For application at a Reynold's number close to $10^6$, at which laminar flow is possible for carefully shaped airfoil profiles, a preferred embodiment for the elastic airfoil section shape t(x) is $$t(x) = c\,(0.34\,\mathrm{Sqrt}\,(x/c) - 0.097\,x/c + 0.142$$
$$(x/c)^2 - 0.53\,(x/c)^3 - 2.08$$
$$(x/c)^4 + 4.13(x/c)^5 - 1.9(x/c)^6)$$

where x/c is the ratio of the distance of a point from the leading edge to the chord c of the airfoil. Several other such shapes are well known from the theory of laminar flow sections.

In addition, analysis shows that to obtain the most desirable aerodynamic features of this profile through the specification of a camber shape w(x) to be achieved under aerodynamic load a stiffness distribution of substantially $$k(x) = N\,s(x) = N * (1.24\,x/c + 32\,(x/c)^3 + 448\,(x/c)^4$$
$$-717(x/c)^5 + 717\,(x/c)^6 - 409\,(x/c)^7 + 102\,(x/c)^8)$$

should be maintained between the pivot axis locations. (This case is referred to as STIFF MC in Table 1). This stiffness distribution is such that the camber shape w(x) naturally takes a desirable form under aerodynamic load. For the airfoil considered here with leading and trailing edge pivots at 10% and 80% of the chord respectively, $K_{crit} = 0.552$.

For the airfoil thickness distribution t(x) described above, the desired stiffness shape function s(x) cannot be obtained with a solid elastic airfoil section formed from material of uniform properties. As discussed above, several possibilities exist to tailor the distribution of stiffness along the airfoil by the use of layered structures. The airfoil section design, shown in FIG. 20 was designed to have a resulting s(x) that approximates the desired s(x). The airfoil section 132 incorporates a stiff trailing edge 120 beyond x/c=0.75, a partial chord spine 156 extending from x/c=0.4 at which point its thickness is 0.15 c to the beginning of the trailing edge x/c=0.75 at which point its thickness is 0.3 c, the spine thickness varying linearly between these two points, and a flexible body 158 of uniform elastic material having the external shape t(x) described above. IT is shown mounted on leading and trailing axles 106, 108 in axles cavities 110, and 112.

In one application, operation in water over a range of speeds from 10 to 30 knots, a family of urethane material was chosen for airfoil construction; these materials have a Poison's ratio of 0.49. Materials with a variety of elastic (Young's) moduli as listed in Table 2 are used for the airfoil elastic body to vary $q_{crit}$. A material (ROYAL Cast 3101 from UniRoyal Inc.) with a modulus of 210,000 psi was chosen for the trailing edge and for the central spine attached to the trailing edge.

In this design a shaping of the spine in the spanwise direction, as shown in FIGS. 12 and 13, was also included to better tailor the stiffness distribution along the chord. The spine was segmented from an initial value $s_o$ at x/c=0.4 to a final value $s_f$ at x/c=0.75 as shown in FIG. 12. In table 2 these values are expressed as the percentage of the spine present across the span at these two points. In this example $s_o = s_f$.

The critical dynamic pressure of a given elastic airfoil is a function only of thickness ratio, $t_{max}/c$, and pivot axis location relative to chord length, elastic airfoils of any desired chord length may be made using these materials and geometry.

As will be discussed below, these airfoil sections or equivalently stiff sections made of alternate materials may also be used for a wing or blade operating in air at subsonic Mach numbers below the critical Mach number of the section (see Ref I.). The corresponding critical speed in air at sea level conditions is also shown in Table 2 assuming a speed of sound a=1100 fps.

Figure 20:
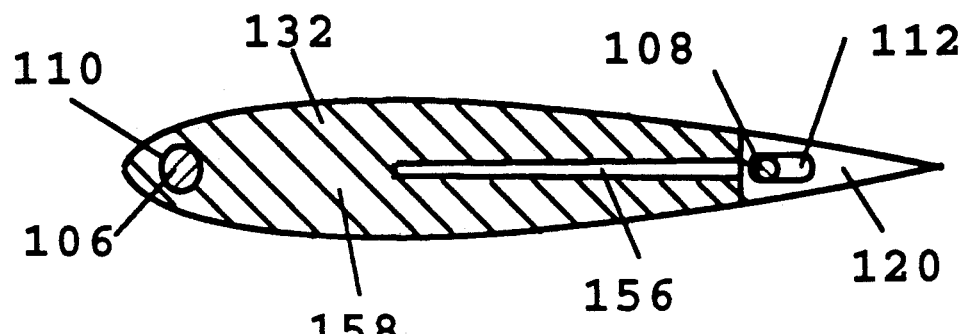
FIG. 20 shows a flexible airfoil with a part chord spine with critical dynamic pressures given in Table 2.

TABLE 2 critical dynamic pressures and critical speeds in knots in air and water for the airfoil of FIG. 20 for various moduli and geometry

| $q_{crit}$ (psi) | $U_{crit,\,water}$ | $U_{crit,\,air}$ | modulus (psi) | $s_o$ | $s_f$ |
|---|---|---|---|---|---|
| 2 | 10 | 300 | 350 | 20% | 20% |
| 4.4 | 15 | 417 | 900 | 40% | 40% |
| 6.4 | 18 | 475 | 1200 | 60% | 60% |
| 7.9 | 20 | 505 | 1600 | 70% | 70% |
| 9.5 | 22 | 532 | 1800 | 90% | 90% |
| 12.3 | 25 | 564 | 2500 | 100% | 100% |
| 17.7 | 30 | 600 | 3800 | 100% | 100% |

Desirable elastic airfoil sections can be designed with any streamlined airfoil shape and for a range of stiffness distributions such as the specific example given herein or any similar shape. The description above demonstrates how the stiffness distribution may be chosen independently of the airfoil shape by suitable layers of materials with different elastic moduli. These methods of calculating the stiffness distribution of a structure and designing a structure to have desired properties are well known in the art. The teaching of the present invention demonstrates how airfoils of desired properties may be constructed with desired stiffness distribution and the critical dynamic pressure may be predicted from the elastic properties of the airfoil.

For flexible elastic airfoil sections other than those whose detailed design is presented herein, the critical dynamic pressure $q_{crit}$ of an elastic airfoil section can be determined by calculating or measuring the effective section stiffness $S_s$ as described above and using the relationship $q_{crit} = A\, S_s$ with $0.09 < A < 0.12$.

e) wings or blades of finite span

Figure 21:
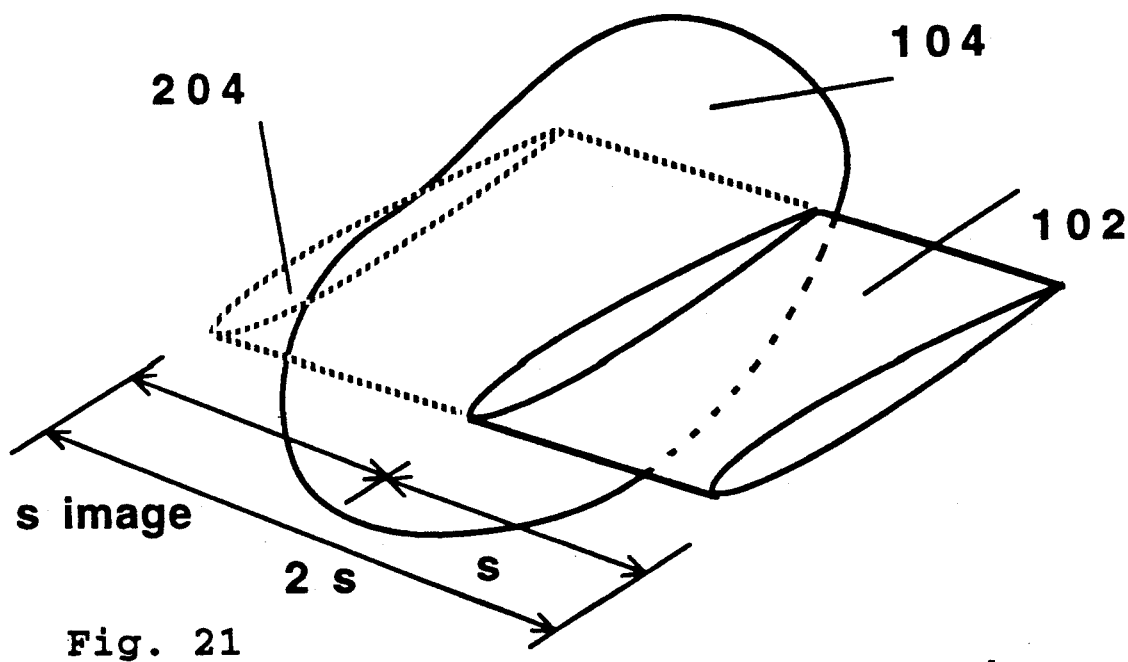
FIG. 21 shows a wing of finite span mounted to a support structure showing the image effect which doubles the aspect ratio.

The design of an elastic airfoil section for a wing or blade of finite span requires analysis of the effects of finite aspect ratio on the airfoil section behavior described above. The aspect ratio of a wing is defined as $AR = \text{span}^2/SA$ where SA is the projected surface area of the wing. However the results of this analysis is governed not only by the actual aspect ratio of the wing or blade but also by the details of its application. For an application in which a wing is mounted to a surface such as a sailboard, or other watercraft, the aspect ratio is effectively doubled by the imaging effect, shown in FIG. 21 in which the presence of the wall 104 is equivalent to that of a image wing 204. FIG. 21 shows the geometry of a finite wing 102 mounted to a supporting structure 104 such that the span s is effectively doubled to 2 s by the image wing. In this case the effective aspect ratio is twice the actual aspect ratio. In discussing the results of analyses the aspect ratio referred to will be the effective aspect ratio. When we discuss a specific application, say to the fin of a sailboard, the aspect ratio referred to will be the actual aspect ratio of the fin.

Analyses indicates that for low Mach numbers the critical dynamic pressure of a wing of finite aspect ratio AR is raised relative to that of the individual airfoil sections which make up the wing (taken to have the same critical dynamic pressure) by an aspect ratio factor of substantially $1/(1-1.3/AR)$ so that $$q_{crit\, finite\, AR} = q_{crit\, airfoil\, section} /(1-1.3/AR)$$

Calculations resulted in aspect ratio factors between $1/(1-1/AR)$ and $1/(1-2/AR)$ with the predominance of the results near $1/(1-1.3/AR)$. Below $AR = 1.3$ the flexible wing will lose the enhanced lift due to camber and the benefits of the present invention will not be obtained.

This formula can be combined with the previously presented results for $q_{crit}$ and $U_{crit}$ for the specific airfoil section of table 2 or to any foil section constructed using the principles disclosed herein to design a finite wing according to the present invention.

For a wing of finite span, the critical dynamic pressure is then expressed in terms of the effective stiffness $S_w$ (as previously defined) and the aspect ratio as $$q_{crit\, finite\, span} = A\, S_w * (1/(1-1.3/AR))$$

For both the airfoil section and the finite wing or blade the coefficient A has been determined to lie in the range $0.09 < A < = 0.12$ with the predominance of the results near $A = 0.1$.

For a wing mounted in a cavity as shown in FIG. 3 and FIG. 17 the critical dynamic pressure is a function of the ratio of the total span $s_{total}$ to the span exposed to the flow $s_{eff}$. Also, pulling the wing into the cavity changes the aspect ratio. Both effects can be combined into a single formula to predict the critical dynamic pressure for such a wing as a function of the critical dynamic pressure of its airfoil section $q_{crit\, airfoil}$.

$$q_{crit\, wing} = q_{crit\, airfoil}\, (s_{total}/se)\, 1/(1-1.3/(AR\, se/s_{total}))$$

where AR is the effective aspect ratio of the wing fully extended with $s_{eff} = s_{total}$.

f) effects of Mach number

The effects of flow Mach number are incorporated into the prediction of critical dynamic pressure by an extension of techniques well known in the art which are valid for an airfoil section operating below its critical Mach number (this use of critical is not related to the use of critical in the present invention; see Ref. 1). In a subsonic flow, the load produced by the process of elastic deflection is increased over that in an incompressible flow by a factor $1/(1-M^2)^{\frac{1}{2}}$. This results in the critical dynamic pressure for an elastic airfoil section being reduced by a Mach number factor $(1-M^2)^{\frac{1}{2}}$ so that $$q_{crit\, M>0} = q_{crit\, M=0}\, (1-M^2)^{\frac{1}{2}}$$

It is well known that, for a wing of finite span, in addition to the effect of Mach number on lift, the effective aspect ratio is reduced by the Mach number factor. Thus, the combined effects of Mach number and finite span for the critical dynamic pressure for a wing or blade, $q_{crit\, wing}$, as compared to its airfoil section at $M = 0$, $q_{crit\, airfoil}$, are given by $$q_{crit\, wing} = q_{crit\, airfoil} * ((1-M^2)^{\frac{1}{2}}/(1-1.3/((1-M^2)^{\frac{1}{2}} * AR)))$$

Table 3 contains the critical dynamic pressures and the corresponding critical speeds for an elastic airfoil section of a given stiffness magnitude and distribution for an application operating in air at finite span and Mach number assuming sea level conditions and a speed of sound of 1100 fps.

TABLE 3

| | Critical speeds of airfoils and wings in air | | | | |
|---|---|---|---|---|---|
| $q_{crit}$ | $U_{critfoil}$ | $U_{critAR=4}$ | $U_{critAR=5}$ | $U_{critAR=10}$ | $U_{critAR=20}$ |
| .08 | 63 | 75.2 | 75 | 73 | 65 |
| .5 | 156 | 187 | 182 | 174 | 161 |
| 2 | 300 | 370 | 370 | 323 | 309 |
| 4.4 | 417 | 555* | 496 | 444 | 430 |
| 6.4 | 473 | — | 577* | 503 | 489 |
| 7.9 | 505 | — | — | 538 | 521 |
| 15.4 | 588 | — | — | 632* | 604 |
| 17.7 | 600 | — | — | — | 615 |

The combined effects of aspect ratio and Mach number lead to a situation where the flexible airfoil cannot be applied above a maximum Mach number dependent on aspect ratio. The boundary is shown in Table 3 by means of the symbol *.

g) aeroelastic effects on airfoil performance

The examples presented above are specific examples of the embodiments of the present invention. The critical dynamic pressures given above for airfoil sections and wings of finite span is determined by the aeroelastic divergence speed for an airfoil section or a wing of finite span pivoted about points close to the leading and trailing edges. Prior art wings are not mounted in this manner. In a standard wing of finite span, the stiffness is so distributed that the airfoil sections are free to twist and the wing bends in the spanwise direction. Aeroelastic deflections of such wing do not provide the benefits of the present invention since the increased lift comes primarily from increases in local angle of attack to the flow due to elastic twisting of the airfoil sections. The essence of the present invention is that airfoil sections and wings of finite span are so constructed and mounted that aeroelastic deformation, rather than having detrimental effects on airfoil aerodynamic performance, is to actually be employed to obtain an unexpected benefit, namely, that of obtaining lift due to camber in a controlled manner. The formulae presented herein instruct how to do this for specific examples. More generally, methods of aeroelastic analysis to predict the aeroelastic divergence speed are available to the designer of a wing more complex than those described herein. In these cases, the teaching of the present invention is that a flexible wing mounted at leading and trailing edge pivot axes incorporating a sliding means can be used to obtain the beneficial effect of providing lift due to camber. These benefits are obtained if the wing is operated at a flow speed which is a substantial fraction (0.6 to 0.95) of that for aeroelastic divergence.

h) design requirements

Figure 22:
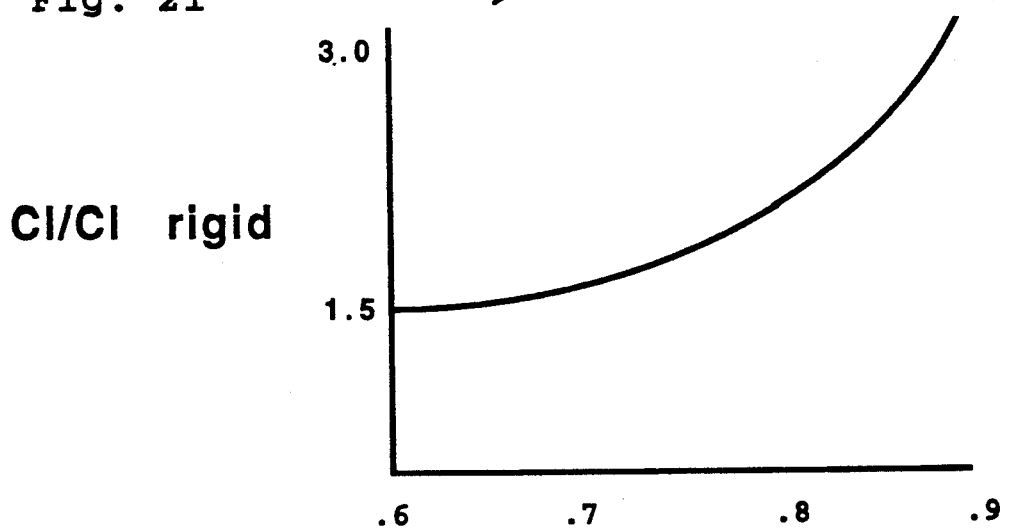
FIG. 22 shows the increased lift of a flexible foil ratioed to that of a rigid foil at the same angle of attack as a function of the ratio of flow speed to critical speed.

To obtain the full benefits of the present invention, the dynamic pressure of design and operation must be below the critical dynamic pressure of aeroelastic divergence as illustrated and defined above. Also, the benefits will not be obtained if the airfoil section is too rigid. FIG. 22 shows the ratio of the lift coefficient for a flexible airfoil or wing to that for a rigid airfoil at the same angle of attack ($C_L/C_L$ rigid) as a function of ratio the speed of operation U to the critical speed $U_{crit}$ of the airfoil or wing. For low $U/U_{crit}$ the airfoil behaves as a rigid foil and the ratio of lift to that of a rigid foil becomes 1. For a speed 65% critical, the lift is increased by a factor 1.5; for a speed 76% of critical, lift is doubled; for a speed 85% of critical, lift is tripled. Therefore, at speeds 80% of critical, roughly equal portions of lift come from angle of attack to the flow and camber deformations. For the airfoils examined, this proportion provided the lowest drag for a given lift in the sense of curve 155 of FIG. 6. Therefore, the design speed should be chosen to be roughly 80% of the critical speed. However, substantial benefits are still obtained if the design speed ranges from 60% to 95% of the critical speed.

To design a wing or blade of finite span for a given application the following procedure is suggested. The design Mach number and speed should be determined for the application. The geometry of the wing, and thus its aspect ratio should chosen by conventional criteria. The designer should assume a lift curve slope for the airfoil sections roughly twice that for a rigid foil in determining the required planform area for a specific application. The shape of the airfoil should be chosen according to known aerodynamic principles. The ratio of design speed to critical speed should be selected; 80% is suggested as an optimum. Thus the desired critical speed of the wing is determined and also its critical dynamic pressure.

Then, the effects of finite span and Mach number are included to determine the required critical dynamic pressure for the airfoil section from the desired critical dynamic pressure for the wing. This may be accomplished through the following formula $$q_{critical\ airfoil\ section} =$$

-continued $$q_{critical\ wing} \left(1 - \frac{1.3}{(AR\sqrt{1-M^2})}\right) \frac{1}{\sqrt{1-M^2}}$$

Once the critical dynamic pressure of the airfoil sections has been determined, the design of the elastic properties of the sections may proceed by the techniques disclosed herein. In most applications the airfoil sections along the span of the wing or blade should have the same critical dynamic pressure.

It will be obvious to one skilled in the art how some of the various aspects of the design of a wing, blade, or other aerodynamic surface of finite span utilizing the present invention are to be accomplished for a given application. As an example, consider the design of a foil for a watercraft for operation at or below a given speed. The foil is designed to be attached to the underside of the vessel by means unspecified. The area, span and thus the effective aspect ratio of the wing is determined by the required lift force, the desire to minimize induced drag, issues of operability and maneuverability and possibly by class rules in the case of competing yachts. For the design of a centerboard, keel or fin to be attached to the bottom wall of a watercraft, the effective aspect ratio is twice the actual aspect ratio due to the image effect of the mounting surface. For operation in water, sweepback of the leading edge is thought to be important for maneuverability and for clearing weeds that may become attached to the leading edge. This leads to either sweeping back the pivot axes or to some comprise of pivot axis placement relative to the leading edge at the root. In general the pivot locations should be placed as close as possible to the leading and trailing edges of the airfoil sections. The mechanical embodiment of the pivot axis mounting means incorporating a sliding means is selected according to the application.

Once the size, geometry and intended operating speed of the wing has been determined, and the pivot axis locations chose, the airfoil sections are designed so that substantially all of the airfoil sections operate below their critical dynamic pressure. (It is straightforward to design all sections to have the same critical dynamic pressure; this should normally be done.) Two methods are presented herein to accomplish this purpose: first, the elastic structure is designed so that the effective airfoil section stiffness $S_s$, define by the point-load method, is that required to achieve the desired critical dynamic pressure for the airfoil section. Alternatively, the formulae presented relating critical dynamic pressure, airfoil stiffness magnitude and stiffness distribution, and axes location for the specific stiffness shape functions considered may be used to design the elastic properties of an airfoil section for a specific application.

Figure 23:
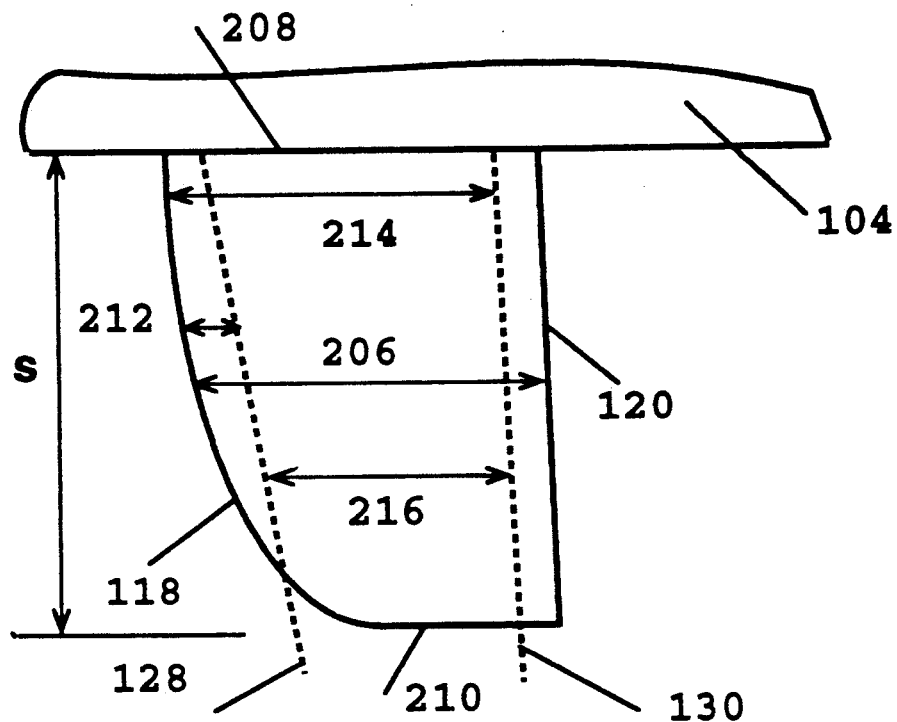
FIG. 23 shows an application of the present invention to a wing of general planform mounted to a support structure.

FIG. 23 shows an embodiment of the present invention in which the flexible airfoil sections are employed to form a wing of finite span of general planform shown here mounted by means unspecified to a support structure 104 which is not part of the invention. The wing has a span s, an average chord $c_{ave}$ 206, a projected surface area SA which is the product of s and $c_{ave}$, an aspect ratio $AR = s^2/SA$, a root section 208, a tip 210, a leading edge 118 and a trailing edge 120. The wing is pivotably mounted by means forming pivot axes at the leading edge, 128, and at the trailing edge 130, at least one pivot axis incorporating sliding means. Calculations indicate that the benefits of the present invention will not be realized if the average of the distance between the wing leading edge and the leading edge pivot axis 212 is greater than 0.25 times the average chord $c_{ave}$ 206; and if the average of the distance between the wing leading edge and the trailing edge pivot axis 214 is less than 0.6 $c_{ave}$; and if the average of the distance between the pivot axis 216 is less than 0.6 $c_{ave}$; said distance averaged over the wing between root and tip.

The design, location and embodiment of the pivot axes is an important part of the design of a system utilizing the present invention. For many applications, transmitting the lift forces to the support structures will cause large bending moments in the pivot attachments and related structures. This requires that the strength of these structures be sufficient for the anticipated loads. One embodiment envisions mounting the wing on two rigid axles located near to the leading and trailing edges of the wing. For an axle of circular cross-section strength requirements may result in large diameter axles. However, for proper operation of the device, it is desired to place the axles as close as possible to the leading and trailing edges of the foil. Therefore, the requirements for airfoil section thinness, especially near the trailing edge, combined with the requirements on axle diameter may require some compromise. There may be other constraints on axle diameter or cross-section dimensions such as related to details of the support structures. However, it is not necessary that the axles be round. Elongated axle shapes may be employed to increase the sustainable root bending moment with less impact on the airfoil section thickness. These axles can be accommodated in the foil structure by suitable shaping of the axle cavities to permit airfoil section rotation about the axle. If required, additional structural members can be employed within suitably shaped cavities to provide additional load carrying capability at large deflections.

Figure 24:
FIG. 24 shows a detail of a leading edge axle and axle cavity.
Figure 25:
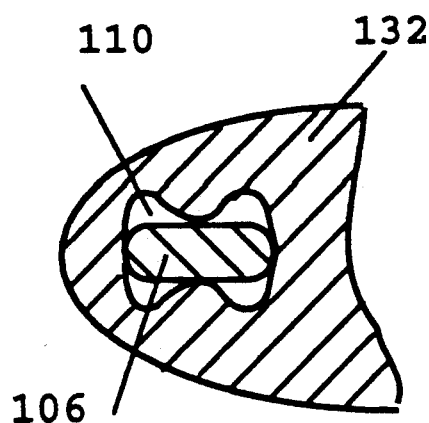
FIG. 25 shows an alternate detail of a leading edge axle and cavity.
Figure 26:
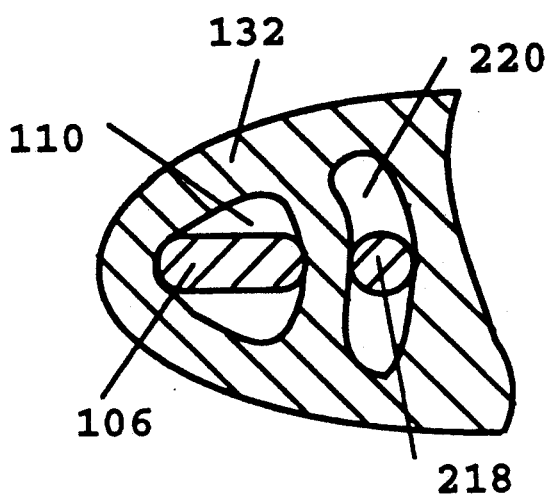
FIG. 26 shows an alternate leading edge cavity and axle with an additional structural member.

FIG. 24 through 26 show a variety of possible designs for leading edge axles and cavities that employ non-circular axles 106 and shaped cavities 110 in the airfoil section 132 to support increased bending moments without corresponding increases in thickness. Additionally FIG. 26 shows a structural member 218 which is placed in a shaped cavity 220 to carry a portion of the load at large deflections. A spring could also be included in cavity 220 to carry load over a wider range of deflections. FIG. 27 shows an alternate trailing edge axle 108 and shaped cavity 112 that permit rotation of the airfoil 132 and transmission of the load to the axle.

i) application to the design of a fin for a sailboard

The disclosed invention has application to the design of a fin or blade for a sailboard. The benefits of the present invention in this application are several: reduced leeway angle; reduced tendency to stall or ventilate leading to a reduced tendency to spinout (loss of control); as well as lower profile drag relative to a rigid foil. The airfoil section is taken as the laminar flow section shown in FIG. 20. The elastic design of the airfoil section is that previously discussed with its critical dynamic pressure and speed given in table 2: an airfoil with a spine unit whose thickness and planform are adjusted so that a single elastic material may be used to design a family of fins for the desired speed range, in this case between 7 and 35 kts.

FIG. 28 shows the fin 222 mounted to a sailboard 224. In one embodiment, it is desirable to adapt the sailboard for use with the flexible fin. One possibility is to construct a cavity for mounting. In one such embodiment, the section through 4-4 of FIG. 28 would be as shown in FIG. 4.

FIG. 29 shows the fin 222 mounted to the sailboard 224 by conventional means employing a standardized mounting structure 226 with mounting fastener 228 to the fin box of the sailboard 224 in FIG. 28. In this example the root chord 230 is 6.5"; the tip chord 232 is 4.5"; the span is 10", giving an aspect ratio for the foil of 1.8; this is effectively doubled in the mounting to the board to 3.6. At this aspect ratio, the critical speed increases by a factor 1.25 above the critical speed for this airfoil section given in Table 2. The operating speed U was chosen as 0.8 $U_{crit}$; at this condition the lift comes equally from camber and angle of attack and the pressure distribution has a favorable shape. This choice of U coincidentally balances the aspect ratio effect so that $U_{design}$ becomes equal to $U_{crit}$ airfoil section. This will not happen for other aspect ratios. The tip of the fin 210 forms a body of revolution having the shape of the airfoil section at the tip chord 232. The wing incorporates a spine unit 166.

The pivot axis mounting means incorporating a sliding means are realized by mounting the wing on rigid axles 106, 108 inserted into cavities 110, 112 moulded into the wing leading and trailing edges. The trailing edge cavity incorporates a slot to provide the sliding means. The leading edge axle is centered at the point $x/c = 0.1$ along the chord. The trailing edge axle is straight and is placed at the point $x/c = 0.8$ at the root chord. The axles are made of stainless steel and are integral with a stainless steel mounting structure 226 that fits into a conventional fin box. This member is made in two parts, joined by an adjustable fitting 227 to permit assembly. The fin is fastened to the axles by conventional fastening means 228 such as screws at the axle tips.

This airfoil design can be used to span the operating range of 8 to 35 knots by choice of the flexible material and spine geometry according to the following table. Since the invention provides benefits from $U = 0.60$ $U_{crit}$ to $U < U_{crit}$, this set of designs will provide foils covering the entire speed range. For use, a foil should be chosen to operate near $U_{design}$ and not above $U_{crit}$.

TABLE 4

| Design parameters for a sailboard fin, U in knots | | | | | |
|---|---|---|---|---|---|
| .66 $U_{crit}$ | $U_{design}$ | $U_{crit}$ | modulus (psi) | $s_0$ | $s_f$ (see FIG. 13) |
| 8.2 | 10 | 12.5 | 350 | 20% | 20% |
| 12.5 | 15 | 18.75 | 900 | 40% | 40% |
| 16.7 | 20 | 25 | 1600 | 70% | 70% |
| 18.3 | 22 | 27.5 | 1800 | 90% | 90% |
| 20 | 25 | 31.25 | 2500 | 100% | 100% |
| 25 | 30 | 37.5 | 3800 | 100% | 100% |

Of course many other designs for sailboard fins are possible using the present invention. Changes in size, planform shape and details of construction and method of attachment can all be accomplished using the principles disclosed herein. For a given foil, operation at a speed below its design speed will provide less benefit of the elastic airfoil and the fin will behave more like a rigid fin. For speeds at or above $U_{critical}$, *the fin will behave as a snap-through device and operate at its maximum camber determined by the geometry of the mounting.* j) application to the design of appendages for watercraft

In another application, consider the design of a centerboard 234 for a catamaran designed to be retractable into a cavity 126 in the watercraft 236, shown in FIG. 30. In this embodiment the effective axes positions are substantially at the center of curvature of the leading edge of the supporting cavity, taken as $x=0.05\ c$, and at the trailing edge, $x=c$. In this case we consider a wing of constant chord c, with a rounded tip, and a stiff leading edge 118 and stiff trailing edge 120. The centerboard is designed to obtain benefit from its flexibility in the range from 15 to 25 knots. For this example, the NACA0012 airfoil is chosen whose shape is given by $t(x)=0.24*c/2*(0.29\mathrm{Sqrt}(x/c)-0.126\ x/c-0.35*(x/c)^2+0.28(x/c)^3-0.10150(x/c)^4$.

The planform of the centerboard 234 is designed to have an effective aspect ratio of 8, including the image effect but operated with at least 25% of the span retracted into the supporting cavity to provide structural support and pivot axis means. Thus the maximum effective aspect ratio is 6. Application of the finite span formula given above predicts that for a design speed of 15 knots, the critical dynamic pressure of the airfoil section should be chosen as 14.3 knots. This insure that the design speed of 15 knots will be reached with the foil extended to 75% of its span while a design speed of 30 knots will be reached if the foil is retracted to 30% of its length.

The desired stiffness shape function is chosen as the stiff mid-chord (MC) previously presented; this function is shown in FIG. 31 as curve 200. For axle locations at $x/c=1$ and $x/c=0.05$ the critical value of K for the stiffness shape function is 1.45. The stiffness shape function for a solid material made into the airfoil shape chosen above with a modulus of 5800 psi (so that the magnitude of the stiffness at $x=0.5\ c$ is that required for the critical speed to be 14.3 knots) is also shown as curve 238 in FIG. 31 in comparison to the desired curve 200 of FIG. 31. The stiffness shape function given by the solid airfoil differs considerably from the desired shape and the design will therefore be modified by the addition of a part chord spine. The final design incorporates a part chord spine, attached to the stiff trailing edge to form a spine unit 166 which has a thickness of 0.029 c and begins at the 25% c. The spine is cut so that only 20% of the spine is present at $x/c=0.25$ increasing to 80% at $x=0.85$, at which point the solid trailing edge begins. The flexible airfoil body has an elastic modulus of 3300 psi, the spine unit a modulus of 210,000 psi. The resulting composite structure stiffness curve 240 of FIG. 31 is a good fit to the desired stiffness curve 200.

The resulting airfoil cross-section is shown in FIG. 32 showing the leading edge 118, the trailing edge 120 the spine unit 166 and the flexible body of the airfoil 158. The leading edge 118 should be stiff or can be stiffened with an internal structural member which can also serve as an adjustable attachment means to support the centerboard in the watercraft and permit its adjustment.

Figure 33:
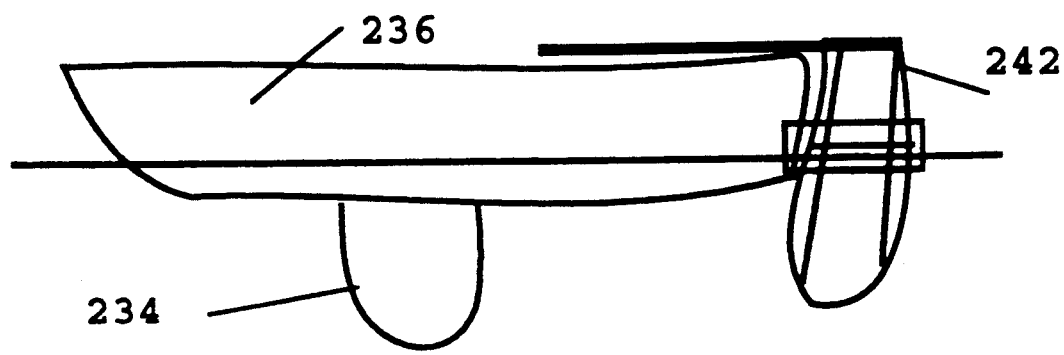
FIG. 33 shows the application to the rudder of a watercraft.

The design principles disclosed can also be applied to the provision of a rudder for a watercraft. An example is shown in FIG. 33 showing a watercraft 236 with a centerboard 234 which may be of conventional design or may incorporate the principles of the present invention. In one embodiment, the watercraft is adapted to utilize the present invention. A rudder 242 is shown constructed according to the present invention. In this example only the rudder near and below the water surface is flexible, the remainder of the rudder is rigid and serves as the mounting structure.

Figure 34:
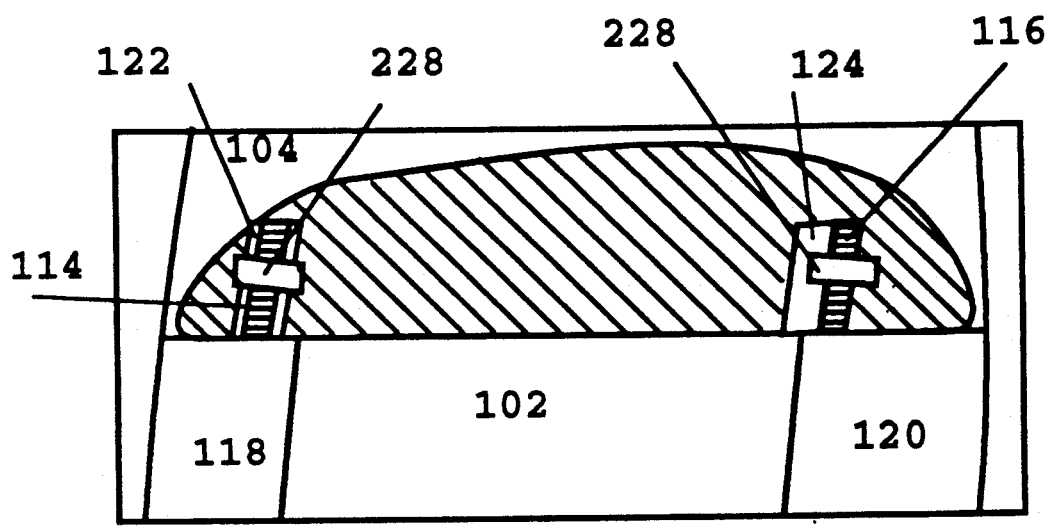
FIG. 34 shows a detail of the rudder of FIG. 33.

FIG. 34 shows a detail of the rudder showing a flexible wing section 102, a stiff leading edge, 118 with a rigid axle integral 114, a stiff trailing edge 120, with a rigid axle integral 116, shown pivotable mounted to a support structure 104, in this case the rigid portion of the rudder 104 by conventional fasteners 228 in cavities 122 and 124. The sliding means is provided by an elongated trailing edge axle cavity 124 in the support structure 104. The average location of the leading and trailing edge pivot axes relative to the leading edge are 10% and 80% respectively. The effective aspect ratio is chosen as 3. For a design speed of 5 knots this rudder can be made out of the foil described in FIG. 31 with a spine thickness 0.008 c having a modulus of 210,000 and a flexible body 102 having a modulus of 100 psi.

k) other applications

Figure 35:
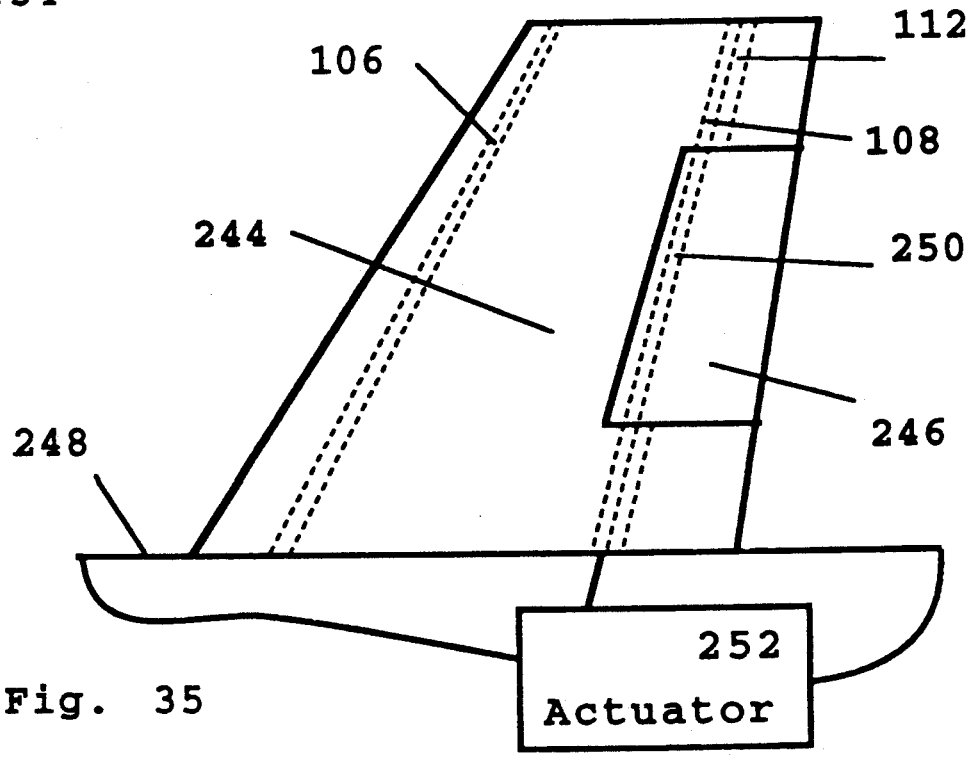
FIG. 35 show an application of the present invention to the aerodynamic surfaces of an aircraft.

The present invention can also be applied to the improvement of aerodynamic surfaces such as sketched in FIG. 35 showing a vertical tail with rudder. In this example the aerodynamic surface 244 with its control surface 246 is mounted to the aircraft 248 on rigid axles 106 and 108 attached to the aircraft, the aerodynamic surface pivotable mounted at its leading and trailing edge by means of leading and trailing edge cavities in the aerodynamic surface 244. The trailing edge axle can also serve as the axle 250 for the control surface 246 incorporating the control surface actuator 252. The elastic properties of this wing may be designed for a desired speed and Mach number using the formulae presented here.

Figure 36:
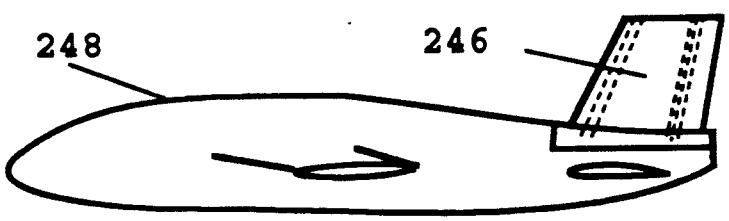
FIG. 36 shows an aircraft incorporating an aerodynamic surface according to the present invention.

FIG. 36 shows an aircraft adapted to utilize the present invention. In this case a mounting is incorporated into the aircraft at the base of the vertical stabilizer to contain the pivotable axle mounting means.

The present invention can be used to design flexible airfoils for rotating machinery such as fans, propellers, wind turbines, and helicopter rotors operating in air and propellers operating in water. These devices fall into two categories: axial flow devices such as propellers, fans and wind turbines that operate with their axis of rotation substantially along the flow direction; and helicopters which operate with the flow substantially perpendicular to the axis of rotation. In both cases, the local dynamic pressure at the airfoil section is a function of airfoil radial position r along the blade, flow velocity and rotation speed. In the most beneficial application of the present invention the airfoils should be designed so that each airfoil section operates at the same ratio of local flow dynamic pressure to airfoil section critical dynamic pressure.

Figure 37:
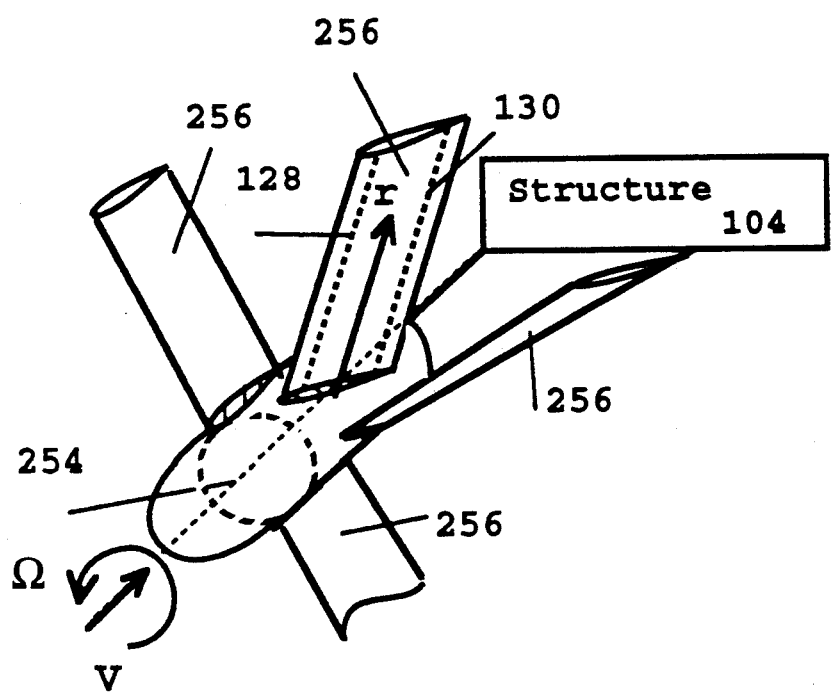
FIG. 37 shows an application of the invention to a fan or wind turbine.

A typical axial flow device is shown in FIG. 37 showing a central rotating hub structure 254 with flexible blades 256 attached by pivot axis mounting means incorporating a sliding means as specified in the present invention forming pivot axes 128 and 130. The rotating device is attached to a vehicle or other support structure 104. The flow velocity is V, the rotation velocity is $\Omega$. The dynamic pressure seen by an individual airfoil section located at a radial station r is given by $q=\frac{1}{2}\rho(V^2+(r\Omega)^2)$. To obtain the benefits of the present invention the airfoil sections should be designed so that $q<q_{crit}$. A value $q_{blade}=0.64\ q_{crit}$ will provide a velocity at the blade section equal to $0.8\ U_{crit}$. For a blade operating in air at speed of sound a, the local Mach number is $M_1=\mathrm{Sqrt}((V^2+(\Omega r)^2)/a$. The critical value of an airfoil section on a rotating blade expressed as a function of its effective stiffness p/w and corrected for local Mach number effects and finite aspect ratio effects is $$q_{critical} = A\ (p/w)\ Sqrt(1-(V^2+(\Omega r)^2)/a^2) / (1-1.3/AR)$$

with $0.09 < A < 0.12$. For a propeller operating in water the Mach number is effectively zero and the critical dynamic pressure for an airfoil on a rotating blade becomes $q_{critical} = A\ p/w\ /(1-1.3/AR)$ with $0.09 < A < 0.12$.

Figure 38:
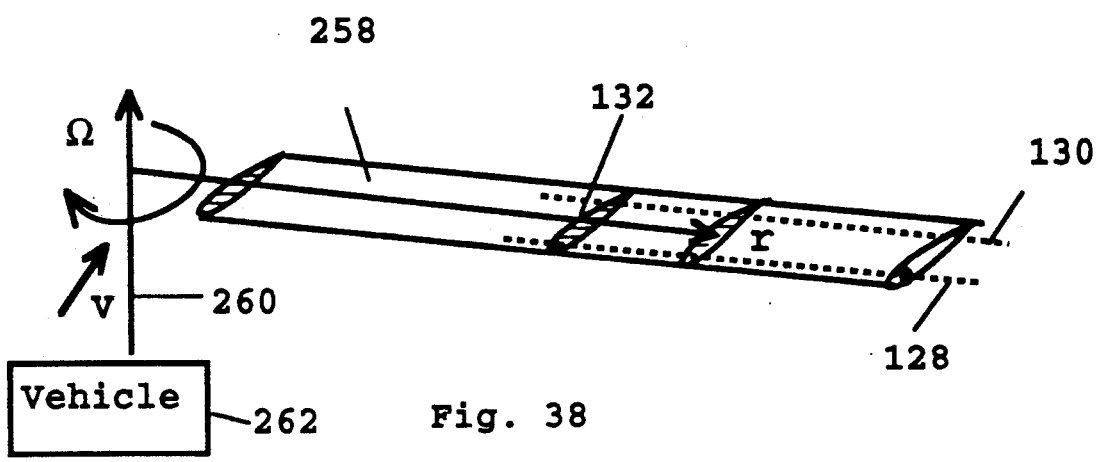
FIG. 38 shows an application of the invention to the rotor blades of a helicopter.

For a helicopter rotor, similar consideration apply. FIG. 38 shows a flexible rotor blade 258 rotating about an axis 260 with rotation speed $\Omega$ and moving at a speed V in the flight direction. The blades are attached by means providing pivot axes to a conventional rotor hub which is incorporated into the vehicle 262 by conventional means. In this case the local dynamic pressure varies around the azimuth of the rotor disk but is maximum when the blade is perpendicular to the flight direction. At this point the local dynamic pressure at the airfoil section is $q = \frac{1}{2} \rho(V+\Omega r)^2$. To obtain the benefit of the present invention the blade sections should be designed to operate below their critical dynamic pressure. The local blade Mach number is $M_1 = (V+(\Omega r))/a$. The critical value of an airfoil section on a rotating helicopter blade expressed as a function of its effective stiffness p/w and corrected for local Mach number effects and finite aspect ratio effects is $qcritical = A\ (p/w)\ Sqrt(1-(V+(\Omega r))^2/a^2) / (1-1.3AR)$ with $0.09 < A < 0.12$. One embodiment of the application of the present invention to rotor blades shown in FIG. 38 is to use a conventional blade and incorporate the flexible blade as a portion near the tip.

These examples show how the principles of the present invention may be applied to a wide variety of airfoils and wings used in a wide variety of devices operating in fluid media but are not to be interpreted as limiting to the various principles and aspect of the present invention.

We claim:

1. A flexible elastic airfoil for generating lift as a result of cambered deflection under load in a moving fluid medium, mounted on a support structure attached to an apparatus operating in contact with a moving fluid medium, said flexible airfoil assembly comprising a) a flexible elastic airfoil section having a leading edge, a trailing edge, a chord c and an exterior profile of a general continuous streamlined shape such that adjacent points on said exterior surface remain in contact as the airfoil deflects in camber, the airfoil being generally made of flexible materials, b) means for pivotably mounting the airfoil near its leading edge forming a leading edge pivot axis, said leading edge pivot axis mounting means attached to the support structure, said leading edge pivot axis mounting means constructed and arranged for passive rotation about the pivot axis the leading edge pivot axis being located a distance in the chordwise direction from the leading edge of the airfoil not exceeding 0.25 of the chord c of the airfoil, c) means for pivotably mounting the airfoil near its trailing edge forming a trailing edge pivot axis, said trailing edge pivot axis mounting means attached to the support structure, said trailing edge pivot axis mounting means constructed and arranged for passive rotation about the pivot axis the trailing edge pivot axis being located a distance in the chordwise direction from the leading edge of the airfoil of at least 0.6 of the chord c of the airfoil, with the distance between the leading edge pivot axis and the trailing edge pivot axis being at least 0.6 c, d) means to permit the airfoil section to slide in a direction generally aligned with its undeformed centerline to permit proportional cambered deflection of the airfoil under load, the sliding means incorporated into one or both of the pivot axis mounting means.

2. The airfoil of claim 1 wherein the leading edge pivot axis mounting means comprises a leading edge mounting axle, rigid in bending in the direction perpendicular to the undeflected airfoil centerline, mounted to the support structure, with the flexible airfoil incorporating a cavity near its leading edge into which said axle is inserted forming a pivotable mount for the airfoil near its leading edge.

3. The airfoil of claim 2 wherein the sliding means is provided by the flexible airfoil having the cavity at its leading edge into which the leading edge mounting axle is inserted being elongated in a direction generally aligned with the undeformed airfoil centerline such that the airfoil may slide relative to the leading edge mounting axle as it deforms under load.

4. The airfoil of claim 1 wherein the trailing edge pivot axis mounting means comprises a trailing edge mounting axle, rigid in bending in the direction perpendicular to the undeflected airfoil centerline, mounted to the support structure, with the flexible airfoil incorporating a cavity near its trailing edge into which said axle is inserted forming a pivotable mount for the airfoil near its trailing edge.

5. The airfoil of claim 4 wherein the sliding means is provided by the flexible airfoil having the cavity at its trailing edge into which the trailing edge mounting axle is inserted being elongated in a direction generally aligned with the undeformed airfoil centerline such that the airfoil may slide relative to the trailing edge mounting axle as it deforms under load.

6. The airfoil of claim 1, pivotably mounted on the pivot axes mounting means incorporating the sliding means having a deflection response w to a load p per unit span concentrated at a point Q on the surface of the airfoil section midway between the leading and trailing edge pivot axis, said deflection w at the point Q being generally proportional to p for w between zero and the value such that the point Q passes through the undeflected centerline of the airfoil section, the ratio p/w being the section stiffness $S_B$ constructed and arranged to operate in a substantially incompressible fluid of dynamic pressure q, such that $1 < A\ S_S$ with $0.09 < A < 0.12$.

7. The airfoil of claim 1, pivotably mounted on the pivot axes mounting means incorporating the sliding means having a deflection response w to a load p per unit span concentrated at a point Q on the surface of the airfoil section midway between the leading and trailing edge pivot axis, said deflection w at the point Q being generally proportional to p for w between zero and the value such that the point Q passes through the undeflected centerline of the airfoil section, the ratio p/w being the section stiffness $S_s$ constructed and arranged to operate in a gas at a dynamic pressure q and a Mach number M, such that $9 < A\ S_s\ Sqrt\ (1-M^2)$ with $0.09 < A < 0.12$.

8. A flexible elastic wing assembly for generating lift as a result of cambered deflection under load in a moving fluid medium, mounted on a support structure attached to an apparatus operating in contact with a moving fluid medium, said flexible wing assembly comprising a) a wing of general planform, having a root section, a tip, a span s, an average chord $c_{ave}$, and an aspect ratio AR, said wing having flexible, elastic airfoil sections having an exterior profile of a general, continuous streamlined shape such that adjacent points on said exterior surface remain in contact as the wing deflects in camber, the wing being generally made of flexible materials, b) means for pivotably mounting the wing near its leading edge forming a leading edge pivot axis, said pivot axis aligned generally in the spanwise direction, said leading edge pivot axis mounting means attached to the support structure, said leading edge pivot axis mounting means constructed and arranged for passive rotation about the pivot axis said leading edge pivot axis passing generally through the airfoil sections at points near the leading edge, the portion of the leading edge pivot axis between the root and tip of the wing being located an average distance in the chordwise direction from the leading edge of the wing not exceeding 0.25 of the average chord $c_{ave}$ of the wing, c) means for pivotably mounting the wing near its trailing edge forming a trailing edge pivot axis, said pivot axis aligned generally in the spanwise direction, said trailing edge pivot axis mounting means attached to the support structure, said trailing edge pivot axis mounting means constructed and arranged for passive rotation about the pivot axis said trailing edge pivot axis passing generally through the airfoil sections at points near the trailing edge, the portion of the trailing edge pivot axis between the root and tip of the wing being located an average distance in the chordwise direction from the leading edge of the wing of at least 0.6 of the average chord $c_{ave}$ of the wing, with the average distance between the portion of the leading edge pivot axis between the root and tip of the wing and the portion of the trailing edge pivot axis between the root and tip of the wing having an average distance in the chordwise direction of at least 0.6 $c_{ave}$, d) means to permit the airfoil sections to slide in a direction generally aligned with their undeformed centerlines to permit proportional cambered deflection of the airfoil under load, the sliding means incorporated into one or both of the pivot axis mounting means.

9. The wing of claim 8 wherein the leading edge pivot axis mounting means comprises a leading edge mounting axle, rigid in bending in the direction perpendicular to the undeflected airfoil centerline, mounted to the support structure, with the flexible wing incorporating a cavity near its leading edge into which said axle is inserted forming a pivotable mount for the wing near its leading edge.

10. The wing of claim 9 wherein the sliding means is provided by the flexible wing having the cavity at its leading edge into which the leading edge mounting axle is inserted being elongated in a direction generally aligned with the undeformed airfoil centerline such that the wing may slide relative to the leading edge mounting axle as it deforms under load.

11. The wing of claim 8 wherein the trailing edge pivot axis mounting means comprises a trailing edge mounting axle, rigid in bending in the direction perpendicular to the undeflected airfoil centerline, mounted to the support structure, with the flexible wing incorporating a cavity near its trailing edge into which said axle is inserted forming a pivotable mount for the wing near its trailing edge.

12. The wing of claim 11 wherein the sliding means is provided by the flexible wing having the cavity at its trailing edge into which the trailing edge mounting axle is inserted being elongated in a direction generally aligned with the undeformed airfoil centerline such that the wing may slide relative to the trailing edge mounting axle as it deforms under load.

13. The wing of claim 8 wherein the leading edge pivot axis mounting means comprises a rigid axle integral with the wing structure and pivotably mounted to the support structure, said structure incorporating a cavity for containing the axle, said axle inserted into the cavity, the rotation of said axle in the cavity forming the pivot axis, with the wing being rigid in bending along the leading edge pivot axis in a direction perpendicular to the undeformed airfoil centerline.

14. The wing of claim 13 wherein the sliding means is provided by the support structure having a cavity elongated in a direction generally aligned with the undeformed centerline of the airfoil, into which the leading edge pivot axle is inserted, such that the axle will slide in cavity as the wing deforms.

15. The wing of claim 8 wherein the trailing edge pivot axis mounting means comprises a rigid axle integral with the wing structure and pivotably mounted to the support structure, said structure incorporating a cavity for containing the axle, said axle inserted into the cavity, the rotation of said axle in the caviy forming the pivot axis, with the wing being rigid in bending along the trailing edge pivot axis in a direction perpendicular to the undeformed airfoil centerline.

16. The wing of claim 15 wherein the sliding means is provided by the support structure having a cavity elongated in a direction generally aligned with the undeformed centerline of the airfoil, into which the trailing edge pivot axle is inserted, such that the axle will slide in cavity as the wing deforms.

17. The wing of claim 8, pivotably mounted on pivot axis mounting means incorporating sliding means having a deflection response w to a load P concentrated in the chordwise direction, and uniformly distributed along the spanwise direction along a line on the wing surface located midway between the leading and trailing edge pivot axis and located between the root and tip of the wing, said deflection w taken at a point Q on the surface of the airfoil section midway between the root and tip of the wing, point Q located on the loaded line on the wing surface, the deflection w being generally proportional to P for w between zero and the value such that the point Q passes through the undeflected centerline of the airfoil section located midway between root and tip, the ratio P/(s w) being the wing stiffness $S_w$, constructed and arranged to operate in a substantially incompressible fluid of dynamic pressure q, such that $q < A\, S_w\, 1/(1-2/AR)$ with $0.09 < A < 0.12$.

18. The wing of claim 8, pivotably mounted on pivot axis mounting means incorporating sliding means having a deflection response w to a load P concentrated in the chordwise direction, and uniformly distributed along the spanwise direction along a line on the wing surface located midway between the leading and trailing edge pivot axis and located between the root and tip of the wing, said deflection w taken at a point Q on the surface of the airfoil section midway between the root and tip of the wing, point Q located on the loaded line on the wing surface, the deflection w being generally proportional to P for w between zero and the value such that the point Q passes through the undeflected centerline of the airfoil section located midway between root and tip, the ratio P/(s w) being the wing stiffness $S_w$ constructed and arranged to operate in a gas at a dynamic pressure q and a Mach number M, such that $a < A\, S_w\, \mathrm{Sqrt}\,(1-M^2)/(1-2/(\mathrm{Sqrt}(1-M^2)AR))$
with $0.09 < A < 0.12$.

19. The wing of claim 8 constructed and arranged to serve as the fin for a sailboard to provide side force, said fin having an aspect ratio greater than 0.65 and being generally made of materials having elastic moduli in the range 100 to 12000 psi.

20. In combination, a sailboard and the wing of claim 8 adapted for use as a fin for said sailboard, the sailboard adapted to incorporate the pivotable means of the wing of claim 8, said sailboard containing at least one cavity for mounting said fin to the sailboard.

21. The wing of claim 8 constructed and arranged to serve as an aerodynamic surface for generating lift.

22. The aerodynamic surface of claim 21 incorporating a control suface for increased control effectiveness, a means for actuating the control surface.

23. An aircraft adapted to incorporate the wing of claim 8 as an aerodynamic surface,
said aircraft incorporating the attachments for the pivotable mounting means.

24. The wing of claim 8 constructed and arranged for use as an appendage for watercraft to provide sideforce,
said wing being made of generally flexible materials having elastic moduli in the range 100 to 12000 psi.

25. a watercraft incorporating the wing of claim 8, adapted to provide side force,
said wing being made of generally flexible material having elastic moduli in the range 100 to 12000 psi.,
the watercraft adapted for incorporating the wing.

26. A flexible, elastic blade assembly for a rotating device operating in a flow mounted on a rotating hub support structure, said flexible blade assembly comprising a) a blade of general planform, having a root section, a tip, a span s, an average chord $c_{ave}$, and an aspect ratio AR, said blade having flexible, elastic airfoil sections having an exterior profile of a general, continuous streamlined shape such that adjacent points on said exterior surface remain in contact as the blade defects in camber, the blade being generally made of flexible materials, b) means for pivotably mounting the blade near its leading edge forming a leading edge pivot axis, said pivot axis aligned generally in the spanwise direction, said leading edge pivot axis mounting means attached to the support structure, said leading edge pivot axis mounting means constructed and arranged for passive rotation about the pivot axis said leading edge pivot axis passing generally through the airfoil sections at points near the leading edge, the portion of the leading edge pivot axis between the root and tip of the blade being located an average distance in the chordwise direction from the leading edge of the blade not exceeding 0.25 of the average chord $c_{ave}$ of the blade c) means for pivotably mounting the blade near its trailing edge forming a trailing edge pivot axis, said pivot axis aligned generally in the spanwise direction, said trailing edge pivot axis mounting means attached to the support structure, said trailing edge pivot axis mounting means constructed and arranged for passive rotation about the pivot axis said trailing edge pivot axis passing generally through the airfoil sections at points near the trailing edge, the portion of the trailing edge pivot axis between the root and tip of the blade being located an average distance in the chordwise direction from the leading edge of the blade of at least 0.6 of the average chord $c_{ave}$ of the blade, with the average distance between the portion of the leading edge pivot axis between the root and tip of the blade and the portion of the trailing edge pivot axis between the root and tip of the blade having an average distance in the chordwise direction of at least 0.6 $c_{ave}$, d) means to permit the airfoil sections to slide in a direction generally aligned with their undeformed centerlines to permit proportional cambered deflection of the airfoil under load, the sliding means incorporated into one or both of the pivot axis mounting means.

27. The blade ov claim 26 wherein the blade is flexible over a portion of its span and relatively stiff over the remainder.

28. The blade of claim 26 wherein the leading edge pivot axis mounting means comprises a leading edge mounting axle, rigid in bending in the direction perpendicular to the undeflected airfoil centerline, mounted to the support structure,
with the flexible blade incorporating a cavity near its leading edge into which said axle is inserted forming a pivotable mount for the blade near its leading edge.

29. The blade of claim 28 wherein the sliding means is provided by the flexible blade having the cavity at its leading edge into which the leading edge mounting axle is inserted being elongated in a direction generally aligned with the undeformed airfoil centerline such that the blade may slide relative to the leading edge mounting axle as it deforms under load.

30. The blade of claim 26 wherein the trailing edge pivot axis mounting means comprises a trailing edge mounting axle, rigid in bending in the direction perpendicular to the undeflected airfoil centerline, mounted to the support structure,
with the flexible blade incorporating a cavity near its trailing edge into which said axle is inserted forming a pivotable mount for the blade near its trailing edge.

31. The blade of claim 30 wherein the sliding means is provided by the flexible blade having the cavity at its trailing edge into which the trailing edge mounting axle is inserted being elongated in a direction generally aligned with the undeformed airfoil centerline such that the blade may slide relative to the trailing edge mounting axle as it deforms under load.

32. The blade of claim 28 wherein the leading edge pivot axis mounting means comprises a rigid axle integral with the blade structure and pivotably mounted to the support structure, said structure incorporating a cavity for containing the axle, said axle inserted into the cavity, the rotation of said axle in the cavity forming the pivot axis, with the blade being rigid in bending along the leading edge pivot axis in a direction perpendicular to the undeformed airfoil centerline.

33. The blade of claim 32 wherein the sliding means is provided by the support structure having a cavity elongated in a direction generally aligned with the undeformed centerline of the airfoil into which the leading edge pivot axle is inserted such that the axle will slide in cavity as the blade deforms.

34. The blade of claim 26 wherein the trailing edge pivot axis mounting means comprises a rigid axle integral with the blade structure and pivotably mounted to the support structure, said structure incorporating a cavity for containing the axle, said axle inserted into the cavity, the rotation of said axle in the cavity forming the pivot axis, with the blade being rigid in bending along the trailing edge pivot axis in a direction perpendicular to the undeformed airfoil centerline.

35. The blade of claim 34 wherein the sliding means is provided by the support structure having a cavity elongated in a direction generally aligned with the undeformed centerline of the airfoil into which the trailing edge pivot axle is inserted such that the axle will slide in cavity as the blade deforms.

36. The blade of claim 26 wherein the leading edge pivot axis mounting means, the trailing edge pivot axis mounting means and the sliding means are provided by mounting the blade to the support structure, said structure containing a cavity into which the wing is inserted, said blade in its undeflected position bearing against the walls of the cavity at its leading and trailing edge and bearing against the side of the cavity in its fully deflected position, with the leading and trailing edges of the wing being made of relatively stiff material.

37. The blade of claim 26 for a fan, axial wind turbine or a propeller, operating in a gas of density p, axial speed V, rotation speed $\Omega$ and speed of sound a with the airfoil section at the radius r pivotably mounted on pivot axis mounting means incorporating sliding means having flexible airfoil sections, each section having a deflection response W to a load p per unit span concentrated in the chordwise direction midway between the leading and trailing edge pivot axis, said deflection w taken at a point Q on the surface of the airfoil section, at the point of load application on the blade surface, the deflection w being generally proportional to p for w between zero and a value such that the point Q passes through the undeflected centerline of the airfoil section located midway between root and tip, the ratio p/w being the local section stiffness $S_s(r)$, r being the radial coordinate of the section, such that $$\tfrac{1}{2}\rho(V^2+\Omega^2r^2) < A\ S_s(r)\ \text{Sqrt}(1-(V^2+\Omega^2r^2)/a^2)/(1-2/AR)$$

with $0.09 < A < 0.12$.

38. The blade of claim 26 for a fan, or a propeller, operating in a fluid of density $\rho$, axial speed V, and rotation speed $\Omega$ with the airfoil section at the radius R pivotably mounted on pivot axis mounting means incorporating sliding means having flexible airfoil sections, each section having a deflection response W to a load p per unit span concentrated in the chordwise direction midway between the leading and trailing edge pivot axis, said deflection w taken at a point Q on the surface of the airfoil section, at the point of load application on the blade surface, the deflection w being generally proportional to p for w between zero and a value such that the point Q passes through the undeflected centerline of the airfoil section located midway between root and tip, the ratio p/w being the local section stiffness $(S_s(r))$, r being the radial coordinate of the section, such that $$\tfrac{1}{2}\rho(V^2+\Omega^2r^2) < A\ S_{sl\ (r)}\ 1/(1-2/AR)$$

with $0.09 < A < 0.12$.

39. The blade of claim 26 for a helicopter rotor operating in air of density $\rho$, forward wpeed V, rotation speed $\Omega$ and speed of sound a with the airfoil section at the radius r having a section stiffness $S_s)r$) such that $$\tfrac{1}{2}\rho(V+\Omega r)^2 < A\ S_s(r)\ \text{Sqrt}(1-((V+\Omega r)/a)^2)/(1-2/AR)$$

with $0.09 < A < 0.12$.

40. An elastic articulated airfoil for generating lift as a result of deflection under load in a moving fluid medium, mounted on a support structure attached to an apparatus operating in contact with a moving fluid medium, said airfoil assembly comprising a) a plurality of sections joined together to form an articulate airfoil section of a general streamlined shape, b) an axis disposed between eac neighboring pair of sections as a means of attaching them together and permitting rotation about said axis, c) means for pivotably mounting the airfoil at an axis near its leading edge forming a leading edge pivot axis, said leading edge pivot axis mounting means attached to the support structure, said trailing edge pivot axis mounting means constructed and arranged for passive rotation about the pivot axis the leading edge pivot axis being locatd a distance in the chordwise direction from the leading edge of the airfoil not exceeding 0.25 of the chord c of the airfoil, d) means for pivotably mounting the airfoil at an axis near its trailing edge forming a trailing edge pivot axis, said trailing edge pivot axis mounting means attached to the support structure, pivotably mounted on the pivot axes mounting means incorporating the sliding means having a deflection response w to a load p per unit span concentrated at a point Q on the surface of the airfoil section midway between the leading and trailing edge pivot axis, said deflection w at the point Q being generally proportional to p for w between zero and a value such that the point Q passes through the undeflected centerline of the airfoil section, the ratio p/w being the section stiffness $S_s$ the trailing edge pivot axis being located a distance in the chordwise direction from the leading edge of the airfoil of at least 0.6 of the chord c of the airfoil, with the distance between the leading edge pivot axis and the trailing edge pivot axis being at least 0.6 c, e) the axes constituting rotation points for the airfoil sections in relation to one another and to the pivot axes mounting means, f) means to permit the airfoil section to slide in a direction generally aligned with its undeformed centerline to permit proportional cambered deflection of the airfoil under load, the sliding means incorporated into at least one of the axes, g) at least one torsion spring located at said axes disposed between the two relatively rotating elements.

41. The airfoil of claim 40 wherein the leading edge pivot axis mounting means comprises a leading edge mounting axle, rigid in bending in the direction perpendicular to the undeflected airfoil centerline, mounted to the support structure, with the airfoil incorporating a cavity near its leading edge into which said axle is inserted forming a pivotable mount for the airfoil near its leading edge.

42. The airfoil of claim 41 wherein the sliding means is provided by the airfoil having the cavity at its leading edge into which the leading edge mounting axle is inserted being elongated in a direction generally aligned with the undeflected airfoil centerline such that the airfoil may slide relative to the leading edge mounting axle as it deflects under load.

43. The airfoil of claim 40 wherein the trailing edge pivot axis mounting means comprises a trailing edge mounting axle, rigid in bending in the direction perpendicular to the undeflected airfoil centerline, mounted to the support structure, with the airfoil incorporating a cavity near its trailing edge into which said axle is inserted forming a pivotable mount for the airfoil near its trailing edge.

44. The airfoil of claim 43 wherein the sliding means is provided by the airfoil having the cavity at its trailing edge into which the trailing edge mounting axle is inserted being elongate in a direction generally aligned with the undeflected airfoil centerline such that the airfoil may slide relative to the trailing edge mounting axle as it deforms under load.

45. The airfoil of claim 40 where at least one of the airfoil sections is rigid.

46. The airfoil of claim 40 where at least one of the airfoil sections is flexible.

47. The airfoil of claim 40, pivotably mounted on the pivot axes mounting means incorporating the sliding means having a deflection response w to a load p per unit span concentrated at a point Q on the surface of the airfoil section midway between the leading and trailing edge pivot axis, said deflection w at the point Q being generally proportional to p for w between zero and a value such that the point Q passes through the undeflected centerline of the airfoil section, the ratio p/w being the section stiffness $S_s$ operating in a fluid of dynamic pressure q such that $q < A S_s$ with $0.09 < A < 0.12$.

48. The airfoil of claim 40, pivotably mounted on the pivot axes mounting means incorporating the sliding means having a deflection response w to a load p per unit span concentrated at a point Q on the surface of the airfoil section midway between the leading and trailing edge pivot axis, said deflection w at the point Q being generally proportional to p for w between zero and a value such that the point Q passes through the undeflected centerline of the airfoil section, the ratio p/w being the section stiffness $S_s$ operating in a gas at a dynamic pressure q and a Mach number M such that $q < A S_s \mathrm{Sqrt}(1 - M^2)$ with $0.09 < A < 0.12$.

49. A flexible elastic wing assembly for generating lift as a result of cambered deflection under load in a moving fluid medium, mounted on a support structure attached to an apparatus operating in contact with a moving fluid medium, said flexible wing assembly comprising:

a) a wing of general planform, having a root section, a tip, a span s, an average chord $c_{ave}$, and an aspect ratio AR, said wing having flexible, elastic airfoil sections having an exterior profile of a general, continuous streamlined shape such that adjacent points on said exterior surface remain in contact as the wing deflects in camber, the wing being generally made of flexible materials, b) means for pivotably mounting the wing near its leading edge forming a leading edge pivot axis, said pivot axis aligned generally in the spanwise direction, said leading edge pivot axis mounting means attached to the support structure, said leading edge pivot axis passing generally through the airfoil sections at points near the leading edge, the portion of the leading edge pivot axis between the root and tip of the wing being located an average distance is the chordwise direction from the leading edge of the wing not exceeding 0.25 of the average chord $c_{ave}$ of the wing, c) means for pivotably mounting the wing near its trailing edge forming a trailing edge pivot axis, said pivot axis aligned generally in the spanwise direction, said trailing edge pivot axis mounting means attached to the support structure, said trailing edge pivot axis passing generally through the airfoil sections at points near the trailing edge, the portion of the trailing edge pivot axis between the root and tip of the wing being located an average distance in the chordwise direction from the leading edge of the wing of at least 0.6 of the average chord $c_{ave}$ of the wing, with the average distance between the portion of the leading edge pivot axis between the root and tip of the wing and the portion of the trailing edge pivot axis between the root and tip of the wing having an average distance in the chordwise direction of at least 0.6 $c_{ave}$, d) means to permit the airfoil sections to slide in a direction generally aligned with their undeformed centerlines to permit proportional cambered deflection of the airfoil under load, the sliding means incorporated into one or both of the pivot axis mounting means, e) said leading edge pivot axis mounting means, the trailing edge pivot axis mounting means and the sliding means provided by mounting the wing to the support structure, said structure containing a cavity into which the wing is inserted, said wing in its undeflected position bearing against the walls of the cavity at its leading and trailing edge and bearing against the side of the cavity in its fully deflected position, with the leading and trailing edges of the wing being made of relatively stiff material.

f) said flexible, elastic wing pivotably mounted on pivot axis mounting means incorporating sliding means having a deflection response w to a load P concentrated in the chordwise direction, and uniformly distributed along the spanwise direction along a line on the wing surface located midway between the leading and trailing edge pivot axis and located between the root and tip of the wing, said deflection w taken at a point Q on the surface of the airfoil section midway between the root and tip of the wing, point Q located on the loaded line on the wing surface, the deflection w being generally proportional to P for w between zero and the value such that the point Q passes through the undeflected centerline of the airfoil section located midway between root and tip, the ratio P/(s w) being the wing stiffness $S_w$.

50. A flexible elastic airfoil for generating lift as a result of cambered deflection under load in a moving fluid medium, mounted on a support structure attached to an apparatus operating in contact with a moving fluid medium, said flexible airfoil assembly comprising
   a) a flexible, elastic airfoil section having a leading edge, a trailing edge, a chord c and an exterior profile of a general continuous streamlined shape such that adjacent points on said exterior surface remain in contact as the airfoil deflects in camber, the airfoil being generally made of flexible materials,
   b) means for freely pivotably mounting the airfoil near its leading edge forming a leading edge pivot axis for allowing free pivotable action, said leading edge pivot axis mounting means attached to the support structure, the leading edge pivot axis being located a distance in the chordwise direction from the leading edge of the airfoil not exceeding 0.25 of the chord c of the airfoil,
   c) means for freely pivotably mounting the airfoil near its trailing edge forming a trailing edge pivot axis for allowing free pivotable action, said trailing edge pivot axis mounting means attached to the support structure, the trailing edge pivot axis being located a distance in the chordwise direction from the leading edge of the airfoil of at least 0.6 of the chord c of the airfoil, with the distance between the leading edge pivot axis and the trailing edge pivot axis being at least 0.6 c,
   d) means to permit the airfoil section to slide in a direction generally aligned with its undeformed centerline to permit proportional cambered deflection of the airfoil under load, the sliding means incorporated into one or both of the pivot axis mounting means.

* * * * *